US008190800B2

(12) United States Patent
Tanaka et al.

(10) Patent No.: US 8,190,800 B2
(45) Date of Patent: May 29, 2012

(54) AUTOMATIC VENDING MACHINE WITH A PLURALITY OF MODULES AND SERIAL BUS SYSTEM

(75) Inventors: Katsuyoshi Tanaka, Tokyo (JP); Atsushi Kishihara, Kokubunji (JP)

(73) Assignee: Hitachi ULSI Systems Co., Ltd., Tokyo (JP)

( * ) Notice: Subject to any disclaimer, the term of this patent is extended or adjusted under 35 U.S.C. 154(b) by 999 days.

(21) Appl. No.: 12/167,533

(22) Filed: Jul. 3, 2008

(65) Prior Publication Data

US 2009/0012646 A1 Jan. 8, 2009

(30) Foreign Application Priority Data

Jul. 6, 2007 (JP) ................................ 2007-178294

(51) Int. Cl.
*G06F 13/00* (2006.01)

(52) U.S. Cl. ....................................... 710/104; 710/106

(58) Field of Classification Search .......... 710/300–317, 710/8–19, 58–62, 104–110, 72–74
See application file for complete search history.

(56) References Cited

U.S. PATENT DOCUMENTS

| | | | | |
|---|---|---|---|---|
| 4,598,379 | A * | 7/1986 | Awane et al. | 700/232 |
| 5,352,957 | A * | 10/1994 | Werner | 315/291 |
| 5,465,333 | A * | 11/1995 | Olnowich | 710/300 |
| 5,535,341 | A * | 7/1996 | Shah et al. | 710/310 |
| 5,787,261 | A * | 7/1998 | Osaka et al. | 710/302 |
| 5,826,068 | A * | 10/1998 | Gates | 713/600 |
| 5,841,983 | A * | 11/1998 | Takaba et al. | 709/225 |
| 5,959,869 | A * | 9/1999 | Miller et al. | 700/231 |
| 6,119,053 | A * | 9/2000 | Taylor et al. | 700/231 |
| 6,202,108 | B1 * | 3/2001 | Autechaud et al. | 710/61 |
| 6,553,434 | B1 * | 4/2003 | Abkarian et al. | 710/18 |
| 6,643,720 | B2 * | 11/2003 | Takeda | 710/61 |
| 7,325,728 | B2 * | 2/2008 | Arora et al. | 235/381 |
| 7,523,239 | B2 * | 4/2009 | Shimizu | 710/110 |
| 7,730,245 | B2 * | 6/2010 | Chao | 710/110 |
| 7,896,241 | B2 * | 3/2011 | Bychkov et al. | 235/381 |

FOREIGN PATENT DOCUMENTS

| | | | |
|---|---|---|---|
| EP | 996103 | A1 * | 4/2000 |
| EP | 1321908 | A2 * | 6/2003 |
| JP | 01-261948 | | 10/1989 |
| JP | 07-021452 | | 1/1995 |
| JP | 2001-266231 | | 9/2001 |
| JP | 2006-184964 | | 7/2006 |

* cited by examiner

*Primary Examiner* — Raymond Phan
(74) *Attorney, Agent, or Firm* — Mattingly & Malur, PC

(57) ABSTRACT

In a configuration where a main control unit and various peripheral modules are bus-connected on a communication line, the communication line includes a control line in addition to signal lines serving as a differential pair. The control line is, for example, a bus of the logical AND. When the main control unit drives the control line to a ‘L’ level for a certain period of time or more, the peripheral modules detect that and carry out a hardware reset for itself. When the main control unit issues a command to output a value of a particular bit of own identification number to the peripheral modules via the signal lines, the peripheral modules output the result to the control line, and the control line performs an AND operation. By utilizing the AND operation result, automatic address allocation to the peripheral modules is carried out.

16 Claims, 15 Drawing Sheets

AUTOMATIC VENDING MACHINE WITH A PLURALITY OF MODULES AND SERIAL BUS SYSTEM

CROSS-REFERENCE TO RELATED APPLICATION

The present application claims priority from Japanese Patent Application No. JP 2007-178294 filed on Jul. 6, 2007, the content of which is hereby incorporated by reference into this application.

TECHNICAL FIELD OF THE INVENTION

The present invention relates to an automatic vending machine and a serial bus system suitable to the same. More particularly, the present invention relates to an input/output interface technique of a serial bus system.

BACKGROUND OF THE INVENTION

For example, Japanese Patent Application Laid-Open Publication No. 2001-266231 (Patent Document 1) discloses a configuration in which a unit body is provided with a plurality of general-purpose interfaces based on RS-232C, and each of the general-purpose interfaces is connected to, for example, a DoPa module (trademark), a PHS module, a modem device, or a personal computer in order to collect the data of various settings or sales of an automatic vending machine online. Japanese Patent Application Laid-Open Publication No. 2006-184964 (Patent Document 2) discloses an automatic vending machine in which a remote controller used in maintenance, a money amount display device which displays the prices of merchandise, and buttons for selecting the merchandise are connected to a main control unit by a serial bus. Note that, in Patent Document 2, functions are enhanced by reducing the number of times of interruptions in serial communication processes.

Japanese Patent Application Laid-Open Publication No. H07-021452 (Patent Document 3) shows a control device of an automatic vending machine which realizes reduction of cost along with simplification of wiring operations and prevents the situation that a sold-out display function malfunctions. Specifically, complexity of wiring and overlapping of noise has been problematic when an alternating-current wiring for an electromagnetic solenoid and a direct-current wiring for a sold-out detection switch are independently provided in a vending mechanism; and this problem is solved by arranging the circuit configuration in the vending mechanism. Japanese Patent Application Laid-Open Publication No. H01-261948 (Patent Document 4) discloses a network system in which a network controller and a plurality of nodes are mutually connected by a hardware reset line in addition to by a serial data transmission path. By virtue of this, the plurality of nodes can be simultaneously reset by the network controller, and noise tolerance with respect to reset signals is also improved.

Recently, along with enhancement of the functions of an automatic vending machine, various modules have been getting mounted in the automatic vending machine. In this case, when the configuration in which the modules are connected to a unit main body (main control unit) in parallel is employed as disclosed in Patent Document 1, connectors and wiring become complex, and, depending on the number of the connectors, adding modules may become difficult. Therefore, as disclosed in Patent Document 2, the configuration in which the modules are connected by the serial bus is conceivable.

In the case where the serial bus is used, when a module is to be added or replaced, the module is connected to the serial bus, and, usually, address setting of the module has to be manually carried out by using a DIP switch or the like. However, in this case, human resources having a certain level of skills have to be ensured, and there is also the possibility of human error, etc. Therefore, realizing maintenance that is not dependent on manpower is desired.

On the other hand, it is known that the noise environment is bad in an automatic vending machine as described in Patent Document 3. The serial bus in the automatic vending machine has sometimes a wiring length of, for example, several tens of meters, and it is correspondingly readily affected by external noise. For example, when the module connected on the serial bus freezes or goes out of control due to the influence of noise, a reset operation can be tried with respect to the module by command input on the serial bus. However, the reset operation by the serial bus becomes difficult in the situation in which, for example, a certain module goes out of control and the module exclusively continues output to the serial bus.

In recent automatic vending machines, for example, the importance of a multimedia display function that draws the attention of customers and increases the purchasing chances has increased, and a large amount of data processing such as contents processing in a main control unit of the automatic vending machine and high-speed data transfer between a contents display unit which displays contents and the main control unit is needed. When the speed of data transfer is increased, the influence of above-described noise is also increased correspondingly. Therefore, ensuring reliability such as fail safe has become more and more important. Furthermore, the various modules which carry out such high-speed data transfer are expected to be increased in the future; and, not to mention ensuring above-described reliability, in consideration of addition of such various modules, the maintenance performance thereof has to be sufficiently taken into consideration.

FIG. 16 is a block diagram showing a configuration example of an automatic vending machine which has been studied by the inventors and is based on a combination of the techniques of Patent Documents 1 and 2, wherein, in the configuration, a main control unit MCTL has a port of a serial bus SB and ports of RS-232C, and various peripheral modules (functional modules) MD are connected to the ports. For example, a money identifying unit MDb, a money amount display unit MDc, a vending unit MDd, and a user input unit MDe are connected to the serial bus SB; and a contents display unit MDa and a communication unit MDf are connected to RS-232C.

The serial bus SB generally has a transfer speed of, for example, several tens of K to several hundreds of K (bps), and the plurality of peripheral modules MD are connected thereto; therefore, the effective processing speed of each of the peripheral modules MD is further slower than the transfer speed. Therefore, since connecting the contents display unit MDa or the like that requires a high processing speed to such SB is difficult, as a countermeasure therefor, separately connecting it to RS-232C is conceivable.

However, in such a configuration, when the peripheral modules MD that require high processing speeds are added later as described above, the number of the ports of RS-232C will be a bottleneck. Therefore, for example, increasing the transfer speed of the serial bus SB and connecting the contents display unit MDa, the communication unit MDf, or the like thereto is also conceivable. However, also in this case, as described above, the problems of reliability that accompanies the reset operation and the maintenance performance not dependent on manpower cannot be solved.

SUMMARY OF THE INVENTION

The present invention has been made in view of the foregoing, and an object of the present invention is to improve reliability of an automatic vending machine and a serial bus system suitable to the same. It is another object of the present invention to improve maintenance performance of the automatic vending machine and the serial bus system suitable to the same. The above-described and other objects and novel characteristics of the present invention will be apparent from the description of the present specification and accompanying drawings.

The typical ones of the inventions disclosed in this application will be briefly described as follows.

A serial bus system of the present invention has a configuration in which a plurality of modules are connected from a communication line by a bus structure, in which the communication line includes a signal line and a control line, and the control line has a bus structure of the AND logic or the OR logic. The signal line can carry out high-speed data transfer, for example, by a differential pair. For example, from a main control module to peripheral modules, transmission of a command signal or transmission, reception, etc. of data signals is carried out via the signal line. On the other hand, the control line may have a slow data transfer speed and is used when the main control module carries out automatic address allocation with respect to the peripheral modules or when the main control module issues hard reset by fixing the line at a ‘H’ or ‘L’ level for a certain period of time or more with respect to the peripheral modules.

In automatic address allocation, by utilizing the AND logic or the OR logic of the control line, the process can be carried out while maintaining high reliability even when there is noise or the like. Moreover, by carrying out this automatic address allocation, the maintenance performance can be improved, for example, in the case where the peripheral modules are added with respect to the communication line. The hard reset is realized by driving the control line to the ‘H’ or ‘L’ level for a certain period of time or more by the main control module and detecting it by the peripheral modules, for example, in the case where the soft reset, which is performed by transmitting a reset command via the signal line, does not work. Therefore, the reset operation can be reliably realized even when there is noise or the like, and reliability such as fail safe can be improved.

Such a serial bus system is particularly effective in application to an automatic vending machine or the like which recently requires high-speed data transfer and is used in the environment having large external noise.

The effects obtained by typical aspects of the invention disclosed in the present application can be described as realization of an automatic vending machine and a serial bus system which are highly reliable. Moreover, an automatic vending machine and a serial bus system having high maintenance performance can be realized.

BRIEF DESCRIPTIONS OF THE DRAWINGS

DESCRIPTIONS OF THE PREFERRED EMBODIMENTS

Hereinafter, embodiments of the present invention will be described in detail with reference to the accompanying drawings. Note that, components having the same function are denoted by the same reference symbols throughout the drawings for describing the embodiment, and the repetitive description thereof will be omitted. In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable.

Further, in the embodiments described below, it goes without saying that the components (including element steps) are not always indispensable unless otherwise stated or except the case where the components are apparently indispensable in principle.

Note that, serial bus systems shown in the following embodiments will be described by taking an automatic vending machine as an example thereof; however, as a matter of course, the serial bus systems are not limited to it and are effective in application to, for example, a system used in an environment in which noise is large as with the automatic vending machine or a system which requires maintenance performance along with installing more peripheral modules.

(First Embodiment)

Figure 1:
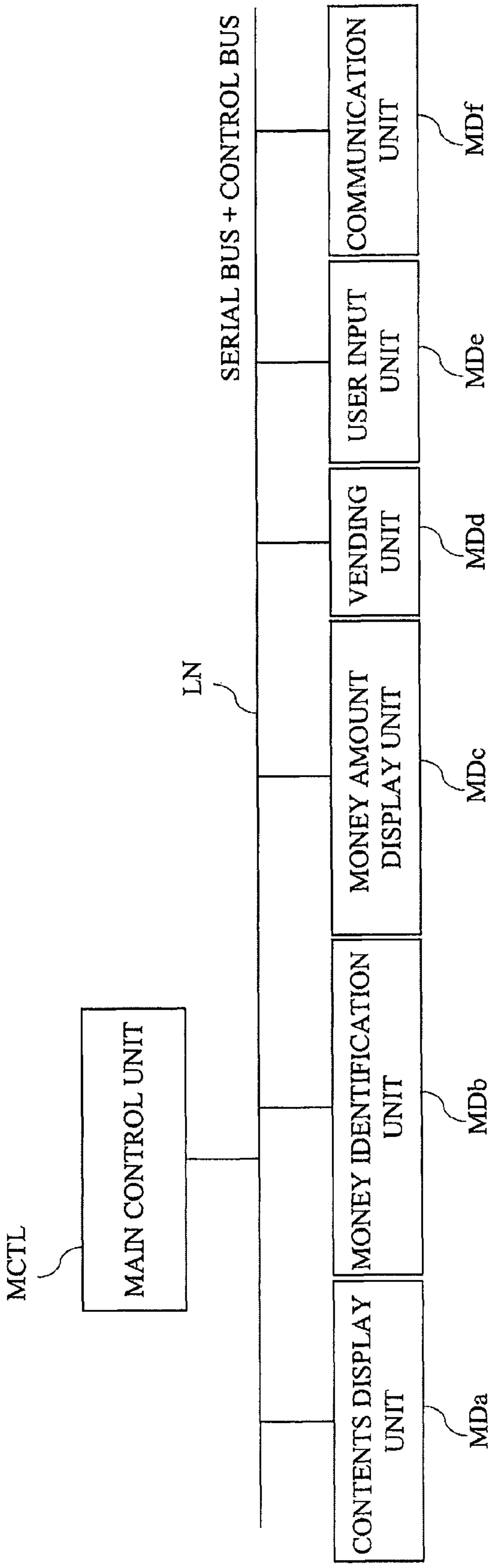
FIG. 1 is a block diagram showing an example of a configuration of an automatic vending machine according to a first embodiment of the present invention.

FIG. 1 is a block diagram showing an example of a configuration of an automatic vending machine according to a first embodiment of the present invention. The automatic vending machine shown in FIG. 1 has a configuration in which a main control unit MCTL and a plurality of peripheral modules MD are connected on a communication line LN. And, it is a feature that the peripheral modules MD connected to the LN includes, for example, a contents display unit MDa and a communication unit MDf in addition to a money identifying unit MDb, a money amount display unit MDc, a vending unit MDd, a user input unit MDe, etc.

The money identifying unit MDb has a function of identifying the money inserted into the automatic vending machine, and the money amount display unit MDc has a function of displaying the identified money. The user input unit MDe has a function of controlling user interfaces typified by buttons of the automatic vending machine, and the vending unit MDd has a function of discharging merchandise corresponding to the pressed button. The communication unit MDf has a function of acquiring data externally or transmitting data to the external by, for example, a wired LAN (Local Area Network) or a wireless LAN, and the contents display unit MDa has a function of displaying the acquired data of contents (for example, advertisements, news, etc.). The main control unit MCTL controls the entire automatic vending machine including, for example, management of the exclusive right of the communication line LN and management of the peripheral modules MD.

Figure 2:
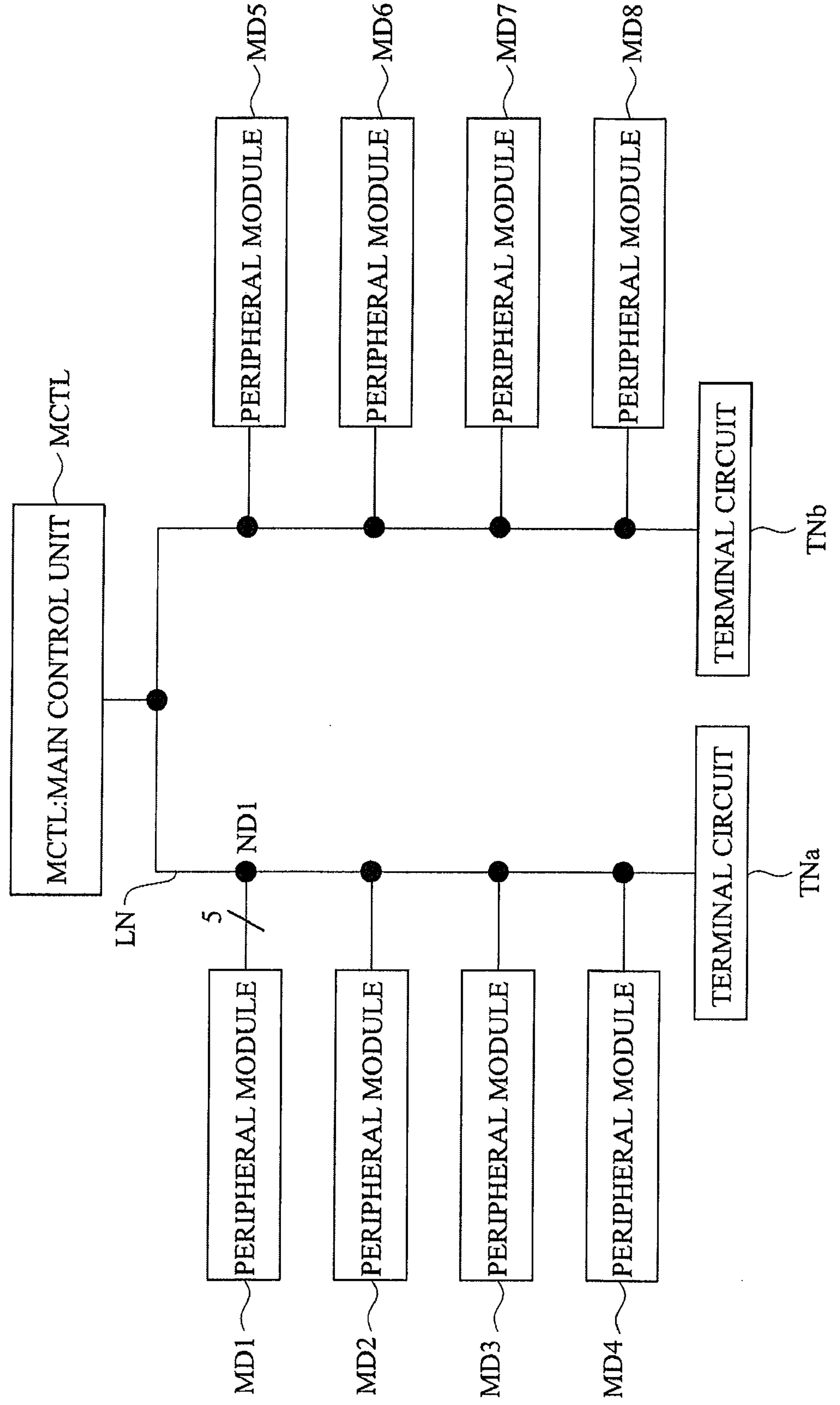
FIG. 2 is a block diagram showing an example of a configuration of a serial bus system according to the first embodiment of the present invention.

FIG. 2 is a block diagram showing an example of the configuration of a serial bus system according to the first embodiment of the present invention. The serial bus system of FIG. 2 is a system in which the wiring topology of the automatic vending machine of FIG. 1 is generalized and substantiated. The serial bus system shown in FIG. 2 has the configuration in which, as with FIG. 1, the main control unit MCTL and a plurality of (herein, eight) peripheral modules MD1 to MD8 are connected on the communication line LN, and terminal circuits TNa and TNb are provided at both ends of the communication line LN. The communication line LN has a wiring length of, for example, several meters to several tens of meters.

Figure 3:
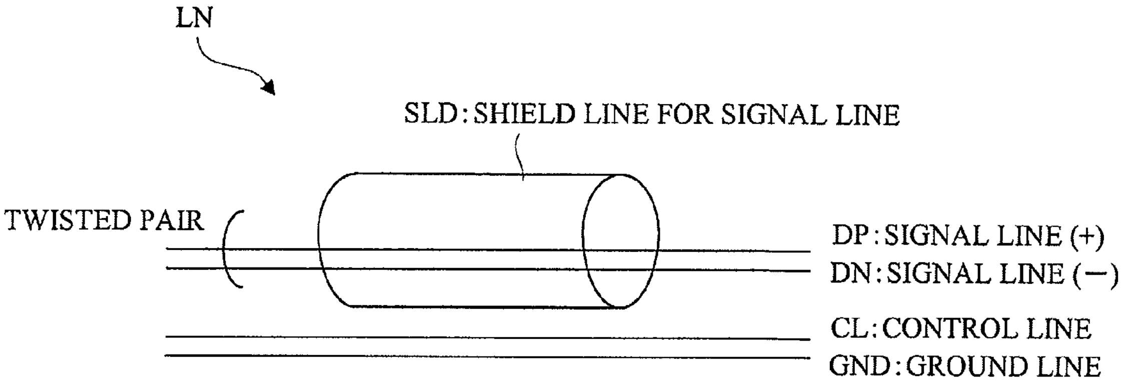
FIG. 3 is a schematic diagram showing a configuration example of a communication line of the serial bus system of FIG. 2.

FIG. 3 is a schematic diagram showing a configuration example of the communication line LN of the serial bus system of FIG. 2. The communication line LN shown in FIG. 3 has a so-called twisted pair structure (reverse phase and also twisted structure) and is characterized by having signal lines DP and DN serving as a differential pair and a shield line SLD for the DP and DN and, in addition to that, a control line CL and a ground line GND for the control line CL. The signal lines DP and DN supports transfer speeds of, for example, several M (Mega) to several tens of M (bps) which are higher than those of conventional automatic vending machines (for example, several tens of K to several hundreds of K), and the twisted pair structure is used from the viewpoint of, for example, reduction of noise. While details will be described later, the control line CL has, for example, a bus structure of the AND logic, and no particular limitation is given on the transfer speed thereof since the data transfer that requires speed is not carried out. However, from the viewpoint of noise, a bus of lower speed than, at least, the signal lines DP and DN is preferred.

Figure 4:
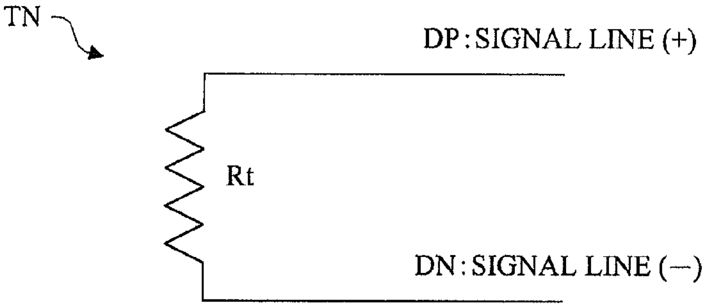
FIG. 4 is a circuit diagram showing a configuration example of a terminal circuit of the serial bus system of FIG. 2.

FIG. 4 is a circuit diagram showing a configuration example of the terminal circuit TN of the serial bus system of FIG. 2. The terminal circuits TNa and TNb of FIG. 2 comprise, as shown in FIG. 4, a terminal resistance Rt connected between the signal line DP and the signal line DN. By virtue of this, waveform reflection at both ends of the communication line LN is suppressed, and high-speed data transfer on the signal lines DP and DN is enabled.

Figure 5A:
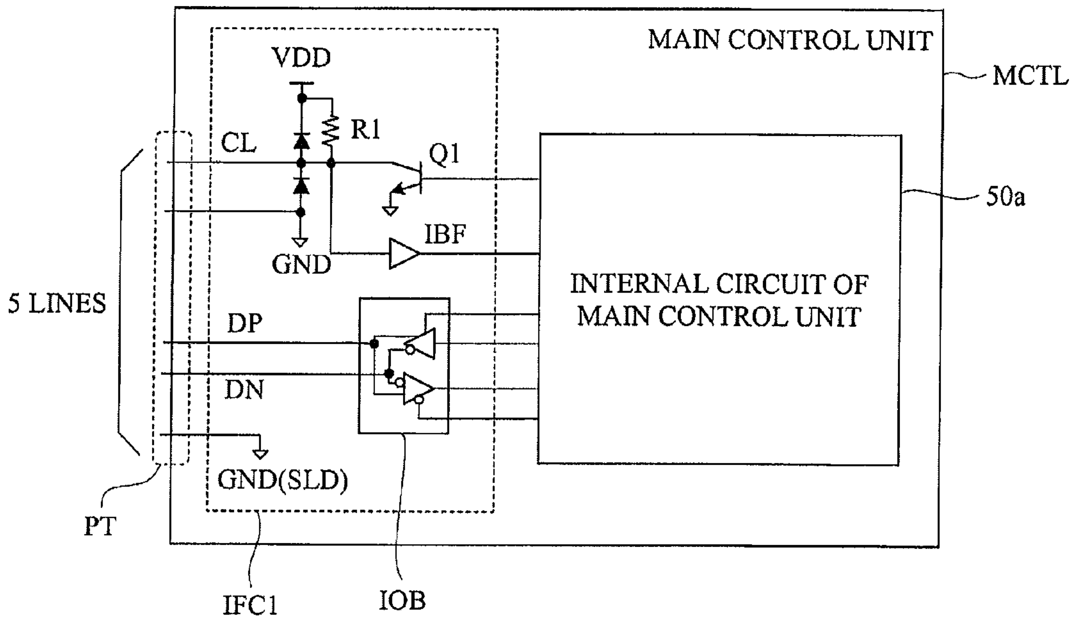
FIG. 5A is a circuit diagram showing a configuration example of a main control unit of a configuration example of interface circuits of the serial bus system of FIG. 2.
Figure 5B:
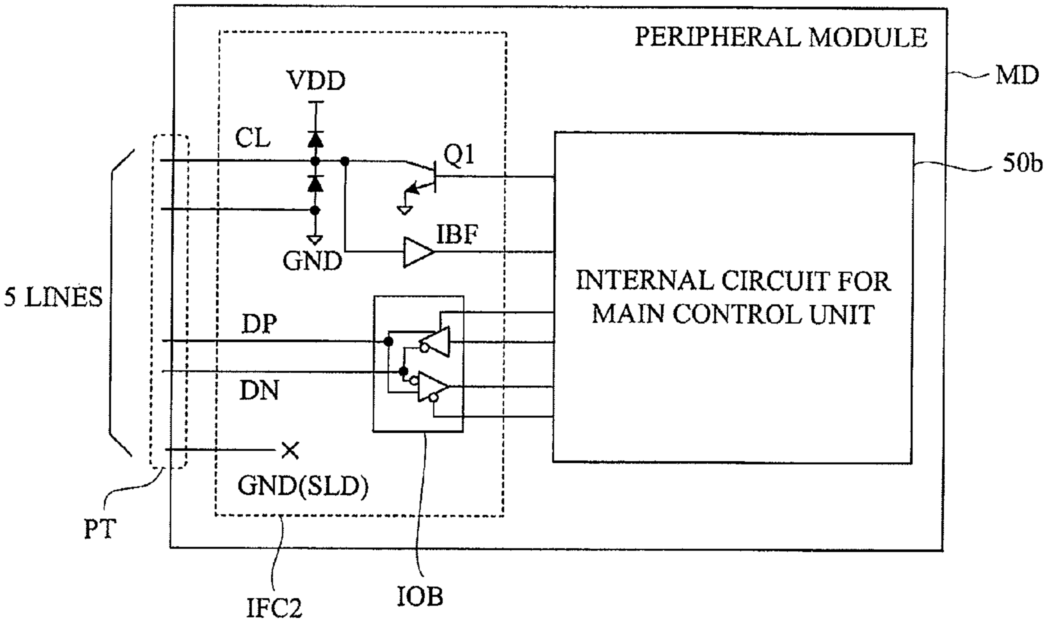
FIG. 5B is a circuit diagram showing a configuration example of a peripheral module of a configuration example of interface circuits of the serial bus system of FIG. 2.

FIGS. 5A and 5B show configuration examples of interface circuits of the serial bus system of FIG. 2. FIG. 5A is a circuit diagram showing a configuration example of the main control unit MCTL, and FIG. 5B is a circuit diagram showing a configuration example of the peripheral module MD. The main control unit MCTL shown in FIG. 5A comprises a port PT to which the above-described communication line LN is connected, an interface circuit IFC1 which carries out transmission and reception of data via the port PT, and an internal circuit 50a which inputs and outputs data to or from the IFC1 and realizes a predetermined function by using the input/output data.

The interface circuit IFC1 includes a resistor R1 which pulls up the control line CL, which is included in the communication line LN, to a power supply voltage VDD, a transistor (switching circuit) Q1 which pulls down this CL to a ground voltage GND in response to control of the internal circuit 50*a*, an input buffer IBF which takes the signal of the CL into the internal circuit 50*a*, and so on. The ground voltage GND with respect to above-described CL is connected to a ground line GND included in the communication line LN. Furthermore, IFC1 includes an input/output buffer IOB which transmits data from the internal circuit 50*a* to the signal lines DP and DN included in the communication line LN and receives data from the signal lines DP and DN and forwards the same to the internal circuit 50*a*, and the ground voltage GND of the above-described IOB is connected to the shield line SLD included in the communication line LN. IOB is based on, for example, the RS-485 standard although no particular limitation is given thereon. Note that, in this case, a diode for clamping is also provided between CL-VDD and between CL-GND in IFC1.

The peripheral module MD shown in FIG. 5B comprises a port PT to which the communication line LN is connected, an interface circuit IFC2 which carries out transmission and reception of data via the port PT, and an internal circuit 50*b* which inputs and outputs data to or from above-described IFC2 and realizes a predetermined function by using the input/output data. The interface circuit IFC2 has a configuration in which the resistor R1 for pull up the control line CL is eliminated from the interface circuit IFC1 of the main control unit MCTL, and the other parts are similar to IFC1.

Figure 6:
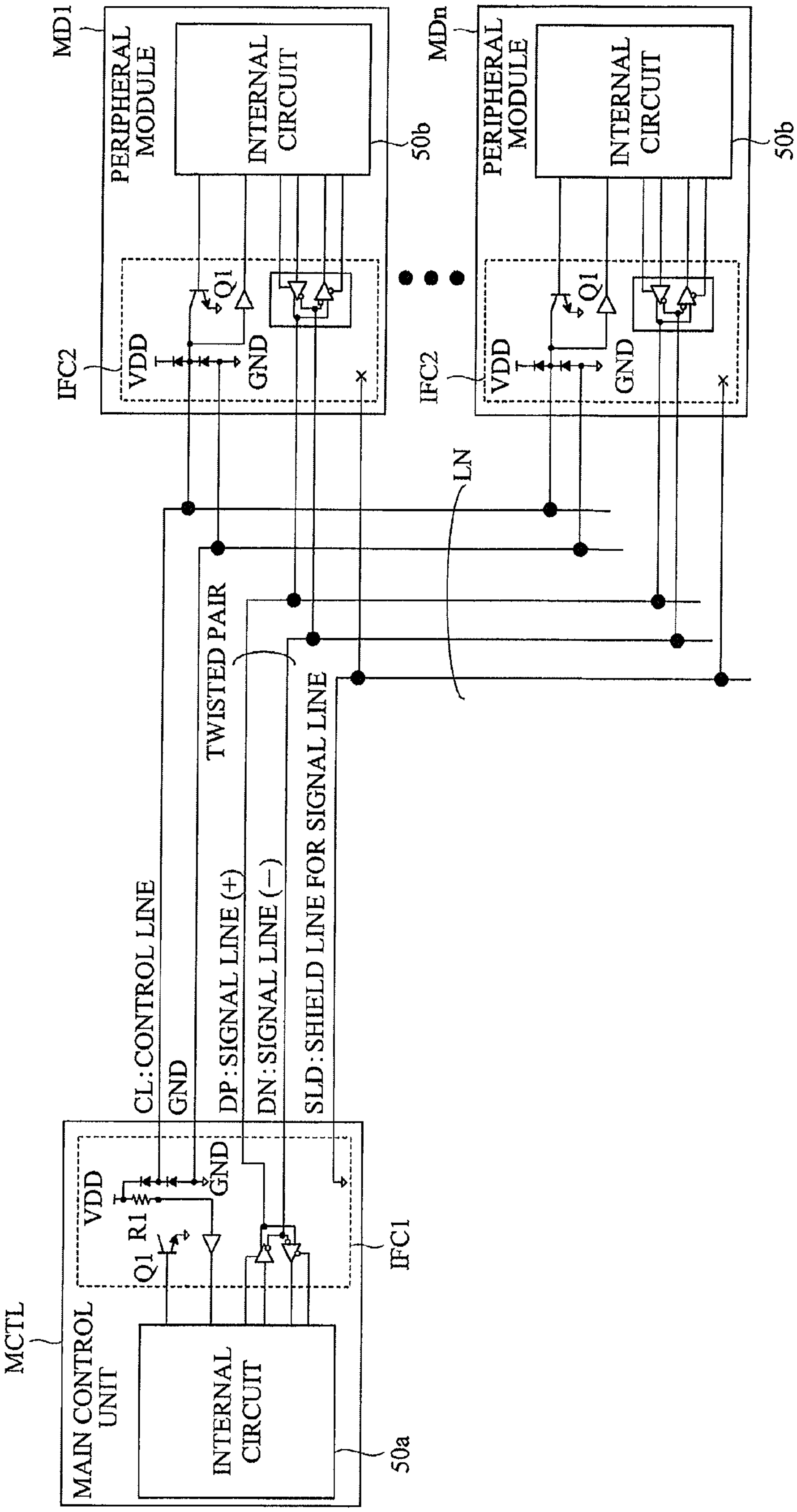
FIG. 6 is a circuit diagram showing a configuration example in which the main control unit and the peripheral modules of FIGS. 5A and 5B are connected by the communication line of FIG. 3.

FIG. 6 is a circuit diagram showing a configuration example in which the main control unit MCTL and the peripheral modules MD of FIGS. 5A and 5B are connected by the communication lines LN of FIG. 3. In FIG. 6, on the communication lines LN, the main control unit MCTL and the plurality of peripheral modules MD1 to MDn are connected. Through the signal lines DP and DN which serve as a serial bus, for example, a signal transmitted from the main control unit MCTL can be received by the plurality of peripheral modules MD1 to MDn, and a signal transmitted by any of MD1 to MDn can be received by the main control unit MCTL or the other peripheral modules MD. A clock-controlled signal of the differential pair passes through the signal lines DP and DN and a command or a data signal is transmitted.

On the other hand, as well as through the control line CL, for example, a signal transmitted from the main control unit MCTL can be received by the plurality of peripheral modules MD1 to MDn, and a signal transmitted from any one of MD1 to MDn can be received by the main control unit MCTL or the other peripheral modules MD. The control line CL is characterized by having the bus structure of the AND logic as is understood from FIG. 6. Specifically, in an initial state, the control line CL is caused to be at the level of the power supply voltage VDD ('H' level) by the pull-up resistor R1 in the interface circuit IFC1 of the main control unit MCTL. Then, when at least one of the main control unit MCTL and the peripheral modules MD1 to MDn drives the transistor Q1 in the interface circuit IFC1 or IFC2 so that the transistor is turned ON via the internal circuit 50*a* or 50*b* in this state, CL is caused to be at a level close to the ground voltage ('L' level).

Major characteristics of the above-described serial bus system are that the control line CL is provided as a part of the communication line LN as described above and that automatic address allocation and hard reset with respect to the peripheral modules MD is carried out by using the control line CL. Hereinafter, the automatic address allocation and the hard reset will be described.

Figure 7:
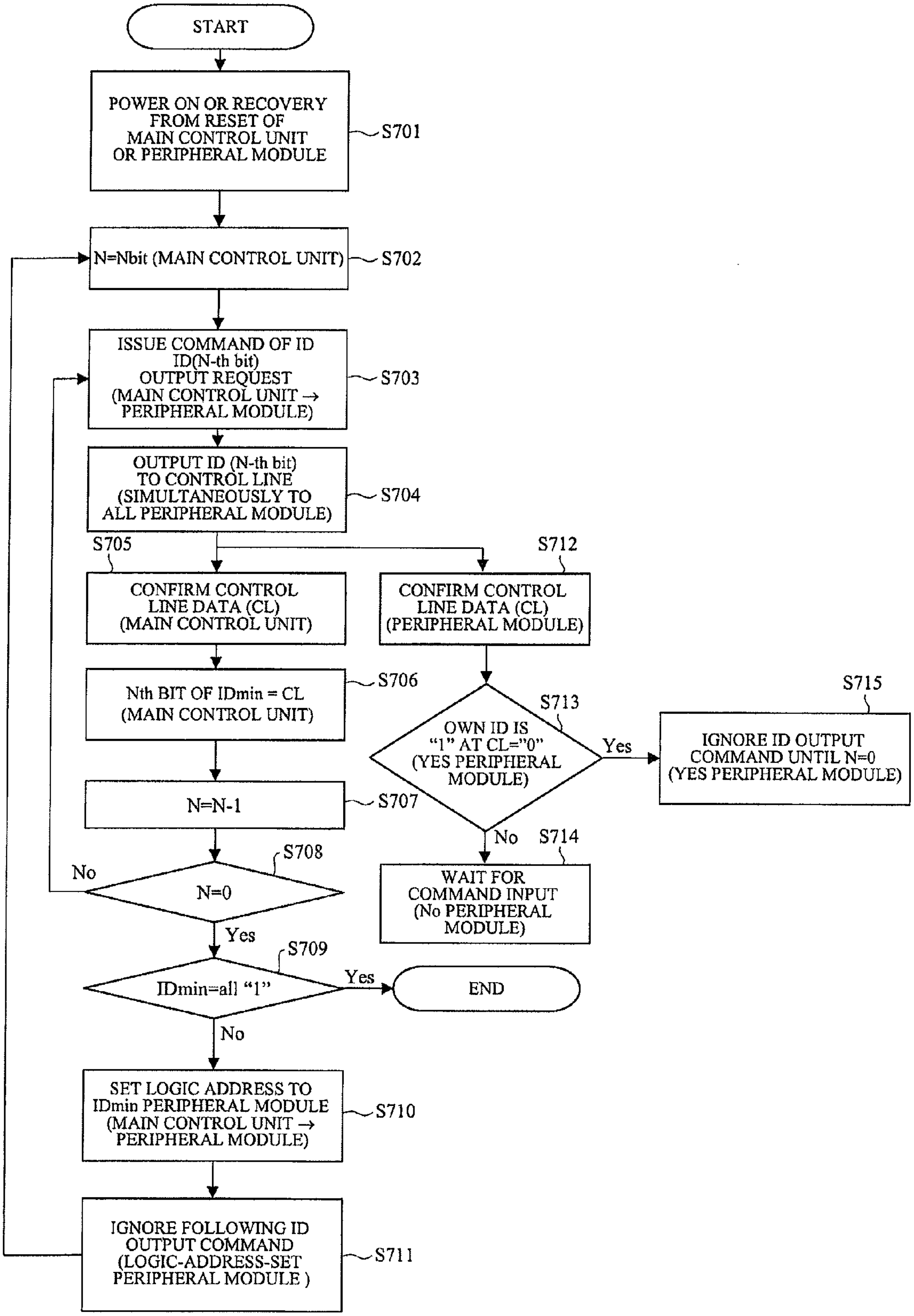
FIG. 7 is a flow chart showing an operation example of an automatic address allocating function of the serial bus system according to the first embodiment of the present invention.
Figure 8A:
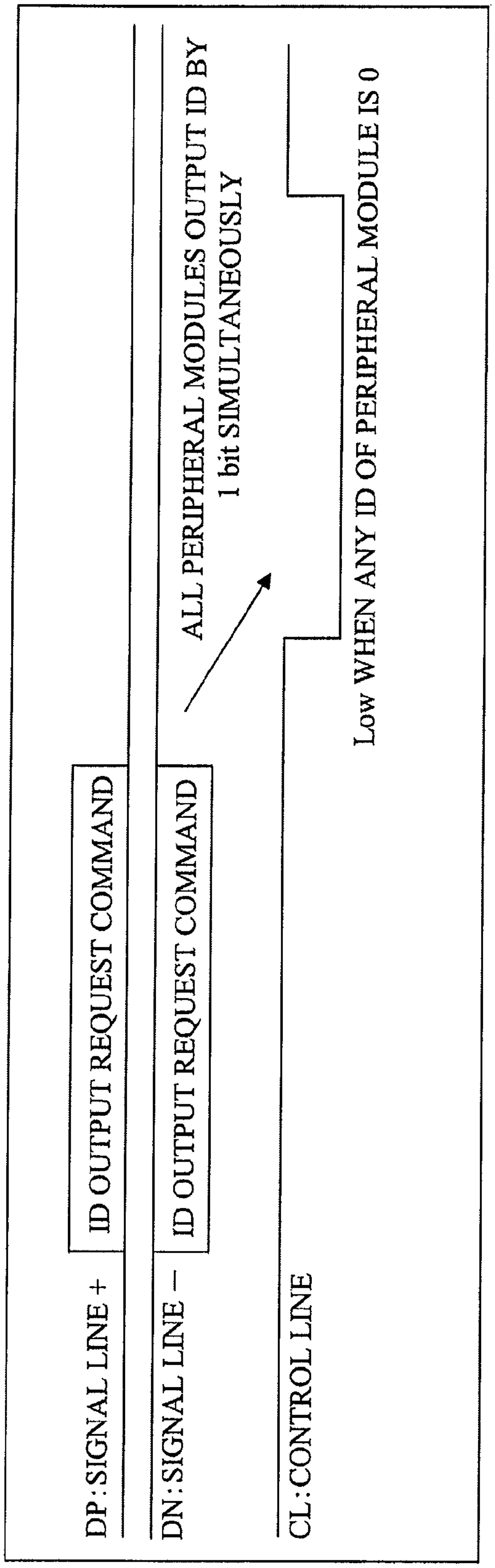
FIG. 8A is a supplementary drawing of the operation example of FIG. 7 showing waveform sequences on the communication lines.
Figure 8B:
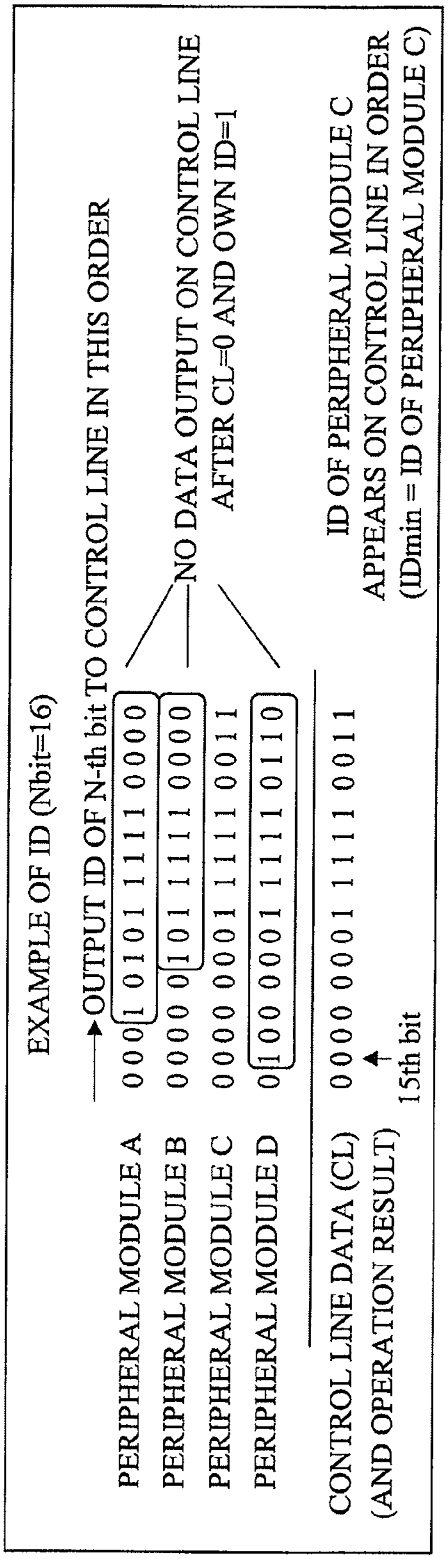
FIG. 8B is a supplementary drawing of the operation example of FIG. 7 showing a specific example of the process of carrying out address allocation of peripheral modules.

FIG. 7 is a flow chart showing an operation example of an automatic address allocating function of the serial bus system according to the first embodiment of the present invention. FIGS. 8A and 8B are supplementary drawings of the operation example of FIG. 7. FIG. 8A is a diagram showing waveform sequences on the communication line LN, and FIG. 8B is a drawing showing a specific example of a process of carrying out address allocation of peripheral modules. First of all, a summary of address allocation sequences will be explained.

As shown in FIG. 8B, the peripheral modules MD (herein, peripheral modules A to D) are provided with unique product identification numbers (IDs) in advance, respectively. Herein, the ID comprises 16 bits. The address allocation sequence used in the present embodiment is such a method that a module having the smallest ID value is specified among the plurality of peripheral modules A to D provided with the IDs, and a predetermined logical address is allocated to the specified peripheral module (herein, the peripheral module C). Then, in this method, when the logical address is allocated to the peripheral module C, the operation of subjecting the peripheral modules A, B, and D excluding the peripheral module C to a similar process is repeated, thereby allocating logical addresses to all the peripheral modules in the end.

In order to realize such address allocation sequence, in each of the peripheral modules A to D, AND operations are carried out sequentially from the most significant bit (16th bit) of the ID of the module, and the AND operation result and the value of the module's own corresponding bit are compared with each other. In this process, if the AND operation result is '0' and the module's (peripheral module D's) own corresponding bit is '1' like the 15th bit of FIG. 8B, it can be understood that the peripheral modules having ID values smaller than that of the peripheral module D's own are present other than the peripheral module D. Therefore, at this point, the peripheral module D is eliminated from the object modules of the AND operations with respect to the less significant bits thereafter. Thereafter, similarly, the peripheral module A is eliminated at the 13th bit, and the peripheral module B is eliminated at the 11th bit. As a result, the peripheral module C finally remains, and the AND operation results of the bits matche with the ID value of the peripheral module C. Therefore, the main control unit MCTL can specify the peripheral module by using this ID value and allocate a predetermined logical address to this peripheral module.

As specific process contents that realize the address allocation sequence of FIG. 8B, first of all, in S701 of FIG. 7, for example, power is turned on with respect to the serial bus system. This process also includes, for example, the case where power is turned on after the peripheral module MD is replaced or added (after it is connected to the communication line LN). In addition, in S701, in the state in which the power of the serial bus system is turned on, a reset operation is carried out with respect to the main control unit MCTL and the peripheral modules MD. In other words, S701 indicates the case where a state that the main control unit MCTL is unable to recognize the peripheral modules MD is occurred.

In such a case, first, the main control unit MCTL defines N bits by using a processing program or the like (S702), and an output request command of the Nth bit is issued with respect to all the peripheral modules MD connected on the communication line LN via the signal lines DP and DN (S703). The N bits correspond to the number of the bits of the ID that each of the peripheral modules MD has and is determined as a fixed value in advance (in the example of FIG. 8B, N=16).

Then, when each of the peripheral modules MD receives such an output request command from the signal lines DP and DN as shown in FIG. 8A, the peripheral module turns on the transistor Q1 so as to drive the control line CL to a 'L' level if the Nth bit of the module's own ID is '0', or the peripheral module maintains Q1 being off if it is '1' (S704). In other words, an AND operation is carried out, and, if there are one or more peripheral modules having '0' as the Nth bit of the module's own ID, the control line CL is driven to the 'L' (='0') level. Otherwise, CL maintains a 'H' (='1') level.

Then, the main control unit MCTL detects the level of the control line CL (S705) and sets the level of the control line CL ('1' or '0') as the Nth bit of IDmin (S706). Above mentioned IDmin corresponds to the AND operation result in FIG. 8B. Meanwhile, the peripheral module MD detects the level of the control line CL (S712) and, if CL is at the '0' level and the Nth bit of the module's own ID is '1' (S713), ignores the output request command(s) issued from the main control unit MCTL thereafter until N=0 is obtained in S708, which will be described later (S715). In S713, if CL is '0' and the Nth bit of the module's own ID is '0', or if CL is '1' and the Nth bit of the module's own ID is '1', the state of accepting an output request command issued next from the main control unit MCTL is maintained (S714).

Subsequently, after S706, the main control unit MCTL causes N to be N=N−1 (S707) and determines whether N=0 or not (S708). If N is not N=0, the process proceeds to S703, and the main control unit MCTL again issues an output request command with respect to the Nth bit, which has been shifted to the less significant side by one bit compared with the previous time, to all the peripheral modules MD. Then, in S704, with respect to this output request command, the peripheral module MD in the above-described state of S715 ignores this output request command, and only the peripheral module MD in the state of S714 accepts the output request command and carries out output with respect to the control line CL (in other words, carries out an AND operation).

Then, whether all the bits of IDmin are '1' or not is checked (S709), and if so, the process is terminated. In other words, this case corresponds to the case where no peripheral module MD that makes a response is present, and allocation of logical addresses to all the peripheral modules MD is completed. Meanwhile, if not all of them are '1' in S709, the main control unit MCTL sets a predetermined logical address with respect to the peripheral module MD indicated by IDmin, for example, by carrying out write to a register or the like of the module from the signal lines DP and DN (S710). Then, the peripheral module for which the logical address is set is set so as to ignore the subsequent output request commands (S711); and the process proceeds to S702, and similar processes are repeated with respect to the remaining peripheral modules MD.

By employing the above-described process, automatic address allocation with respect to the peripheral modules MD is enabled without the intermediation of manpower, and the maintenance performance of the serial bus system (automatic vending machine) can be improved. Furthermore, since the responses of the ID values from the peripheral modules MD are made by using the control lines CL of the AND logic, highly-reliable and ensured address allocation can be realized.

Thus, in some cases, carrying out automatic address allocation by using the signal lines DP and DN is also conceivable. In this case, since the signal lines DP and DN cannot realize AND operations, etc., this case can employ the method in which, for example, the main control unit MCTL specifies a Nth bit, and in response to this, the peripheral modules output a response signal '0' with respect to the signal line DP if the Nth bit of the module's own ID is '0' and does not output a response signal if it is '1'. As a result, when the Nth bit of the module's own ID is '1' and the signal line DP is '0', the peripheral module is capable of identifying the fact that there is a peripheral module(s) having an ID value smaller than that of the module.

However, in this case, for example, if the Nth bit of all the peripheral modules is '1', the signal line DP becomes a high impedance level; therefore, the peripheral modules and the main control unit have to be determined including the high impedance level. Furthermore, since the data transfer speed of the signal line DP is high, attention has to be paid to the timing of the determination. As described above, since external noise is large in automatic vending machines, imparting reliability to such logical determination level and determination timing is not easy. Thus, when the above-described control line CL provided with the AND logic is used, the logic level always becomes '1' or '0'; furthermore, since it is free from the restriction of the data transfer speed, a response output period from the peripheral modules can be sufficiently reserved, and the determination timing thereof does not cause a problem. Therefore, high reliability can be realized.

Figure 9:
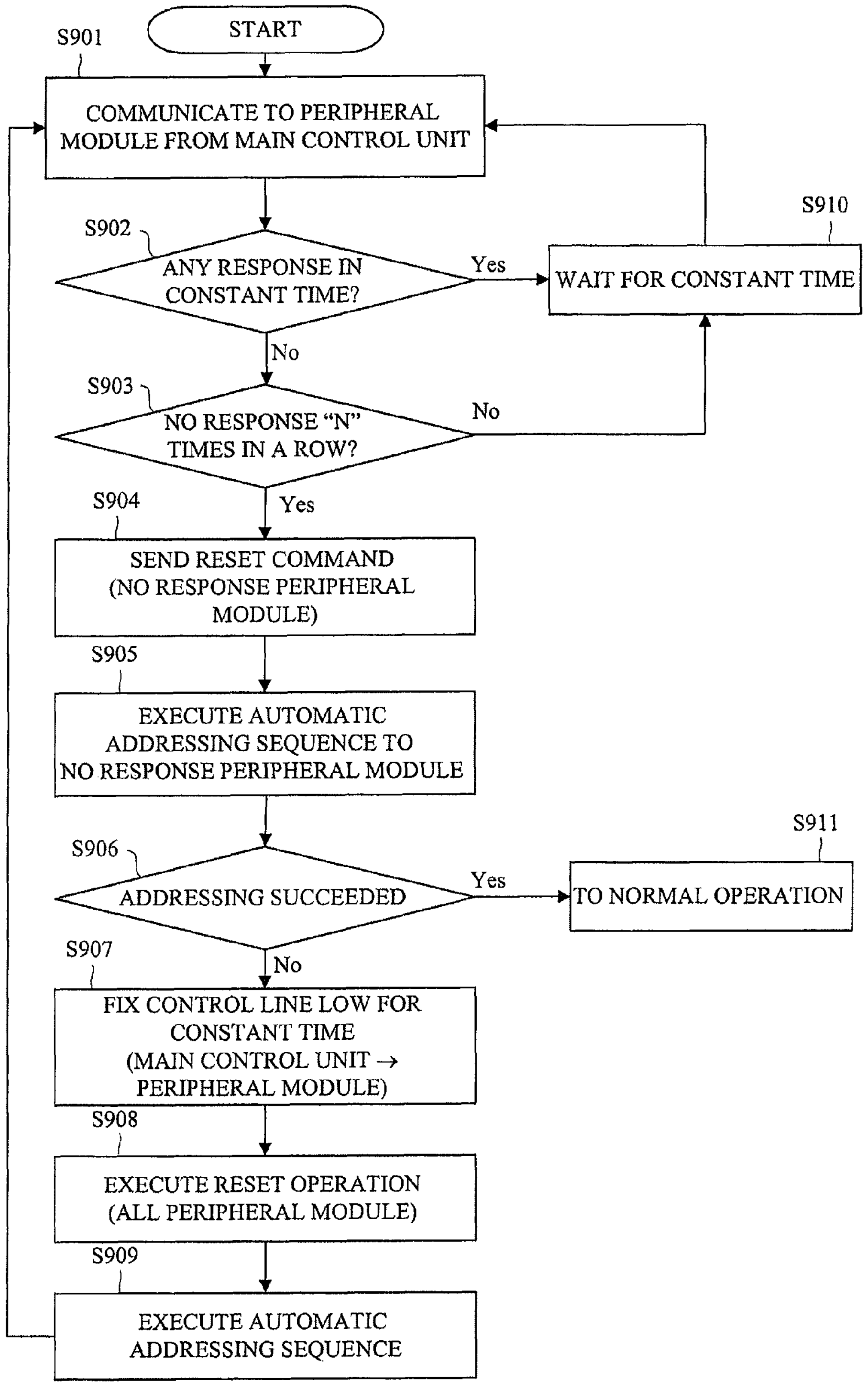
FIG. 9 is a flow chart showing an operation example including a hard reset function of the serial bus system according to the first embodiment of the present invention.
Figure 10:
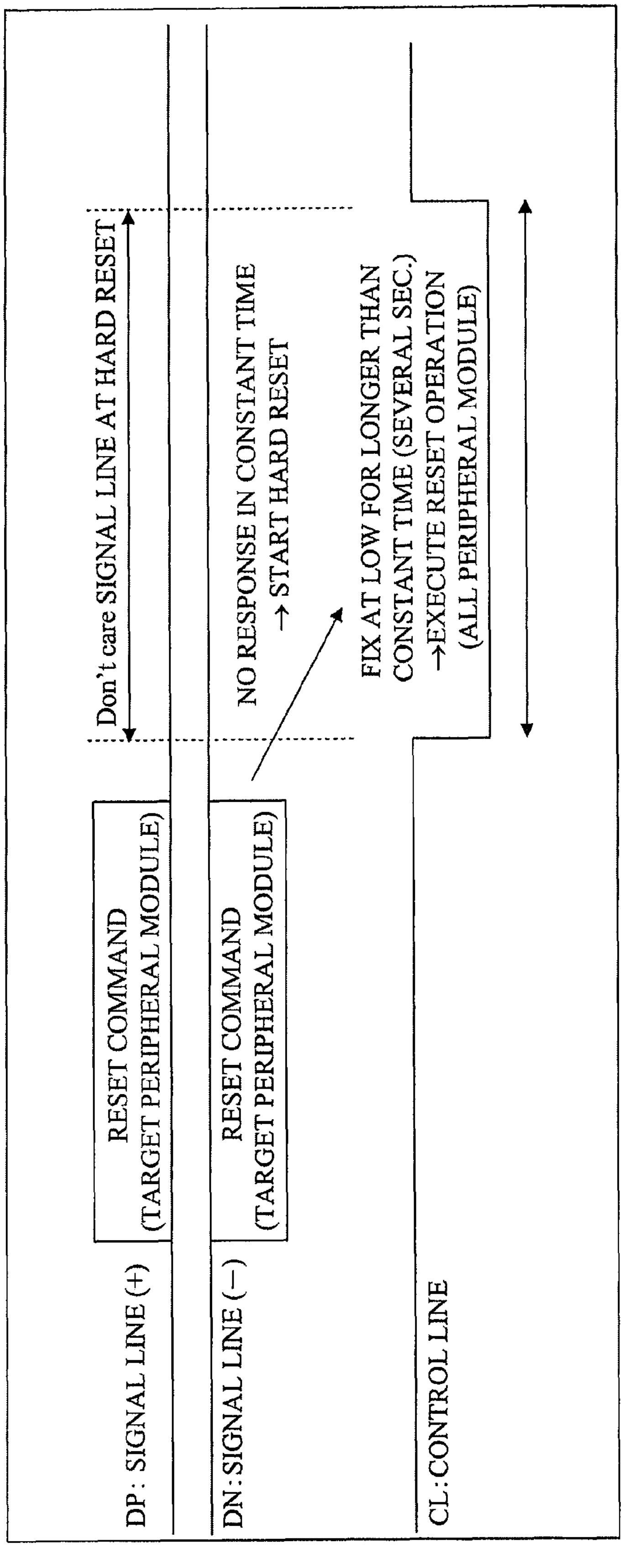
FIG. 10 is a supplementary diagram of the operation example of FIG. 9 and is a diagram showing waveform sequences on the communication lines.

FIG. 9 is a flow chart showing an operation example including a hard reset function of the serial bus system according to the first embodiment of the present invention. FIG. 10 is a supplementary diagram of the operation example of FIG. 9 and also is a diagram showing waveform sequences on the communication line LN. First of all, a summary of the hard reset function will be described by using FIG. 10.

The serial bus system of the present embodiment has a soft reset function and the hard reset function. As shown in FIG. 10, the soft reset function specifies the peripheral modules MD according to logical addresses by using the signal lines DP and DN and issues a reset command to the peripheral modules MD. In this case, the peripheral modules MD interpret the reset command and carry out a reset operation of themselves. However, as described above, for example, in the case where the peripheral module MD freezes or in the case where the signal lines DP and DN of the communication line LN are occupied due to malfunction, it is feared that such soft reset function may be invalidated.

Accordingly, in such a case, the main control unit MCTL uses the hard reset function. According to the hard reset function, the main control unit MCTL drives the control line CL to be the 'L' level for a certain period of time (for example, several seconds) or more. In response to this, all the peripheral modules MD detect the 'L' level that is kept for the certain period of time or more and reset themselves in terms of hardware. Specifically, the hardware always monitors the control line CL by utilizing, for example, a timer circuit and, when the level is kept for the certain period of time or more, reset is executed by a first-priority interruption process.

In order to realize such reset operation, in S901 of FIG. 9, the main control unit MCTL firstly carries out communication with respect to a particular peripheral module MD. Then, the main control unit MCTL monitors whether there is a response from the peripheral module MD serving as the communication object within a certain period of time or not (S902). If there is a response, after a certain period of time is waited for (S910), the process again proceeds to S901, and the communication with the peripheral module MD is continued. On the other hand, if there is no response, the communication from the main control unit MCTL to the peripheral module MD is tried several times via S910 and S901 while counting the number of times of the communication.

In this process, if there is no response in successive N times (S903), the peripheral module MD without this response is specified so as to transmit a reset command thereto by using the signal lines DP and DN (S904). In other words, soft reset is carried out. The 'soft reset' described herein refers to the act of causing the state of software to be an initial state. Then, the main control unit MCTL carries out automatic address allocation as described in FIG. 7 and FIGS. 8A and 8B with respect to the peripheral module MD (S905). If the soft reset succeeds, only the peripheral module MD for which the soft reset is carried out makes a response in the automatic address allocation process of FIG. 7; therefore, acquisition of an ID and allocation of a logical address can be immediately carried out.

Then, the main control unit MCTL determines whether the allocation of the logical address with respect to the peripheral module MD for which the soft reset is carried out succeeded or not (S906), and, if it succeeded, the process returns to a normal operation (S911). On the other hand, if it failed, the main control unit MCTL fixes the control line CL to the 'L' level for a certain period of time (for example, several seconds) or more (S907). In response to this, all the peripheral modules MD connected to the communication line LN execute a reset operation (S908). In other words, hard reset is carried out. After the hard reset is completed, the automatic address allocation as explained in FIG. 7 and FIGS. 8A and 8B is carried out (S909).

As described above, by using the serial bus system capable of carrying out the hard reset by the control line CL, a reset operation can be carried out by a different path even when the soft reset does not work; therefore, reliability such as fail-safe can be improved. Furthermore, in this process, the reset can be carried out by the signal of the 'L' level of the control line CL for a certain period of time or more by which the influence of noise causes almost no problem; therefore, a highly reliable and ensured reset operation can be realized.

As described above, by using the serial bus system (automatic vending machine) of the first embodiment, improvement of reliability and/or maintenance performance is realized. Note that, in the serial bus system of the first embodiment, the bus of the AND logic is used as the control line; however, it can be changed to a bus of the OR logic. In this case, for example, in FIGS. 5A and 5B, the resistor R1 for pull-up can be changed to that for pull down, and the transistor Q1 for pull-down can be changed to that for pull-up. Furthermore, in the automatic address allocation of FIG. 7 and FIGS. 8A and 8B, the above-described sequence can be changed to the sequence in which the peripheral module MD having the largest ID value is specified from the less significant bit toward the more significant bit of the ID; and, in the hard reset function of FIG. 9 and FIG. 10, the above described specification can be changed so that the 'H' level for a certain period of time or more is used.

In the AND logic, a NMOS transistor, an NPN bipolar transistor, or the like is used as the transistor Q1; however, in the OR logic, a PMOS transistor, a PNP bipolar transistor, or the like is used as the transistor Q1. Generally, the NMOS transistor, etc. have higher drive power than the PMOS transistor, etc.; therefore, from the viewpoint of ease of realization, using the AND logic is desirable.

(Second Embodiment)

In a second embodiment, a configuration example which is a modification of the wiring topology of FIG. 2 described in the first embodiment will be described. In addition, a detailed configuration example including the internal circuits of the main control unit and the peripheral module will be also described.

Figure 11:
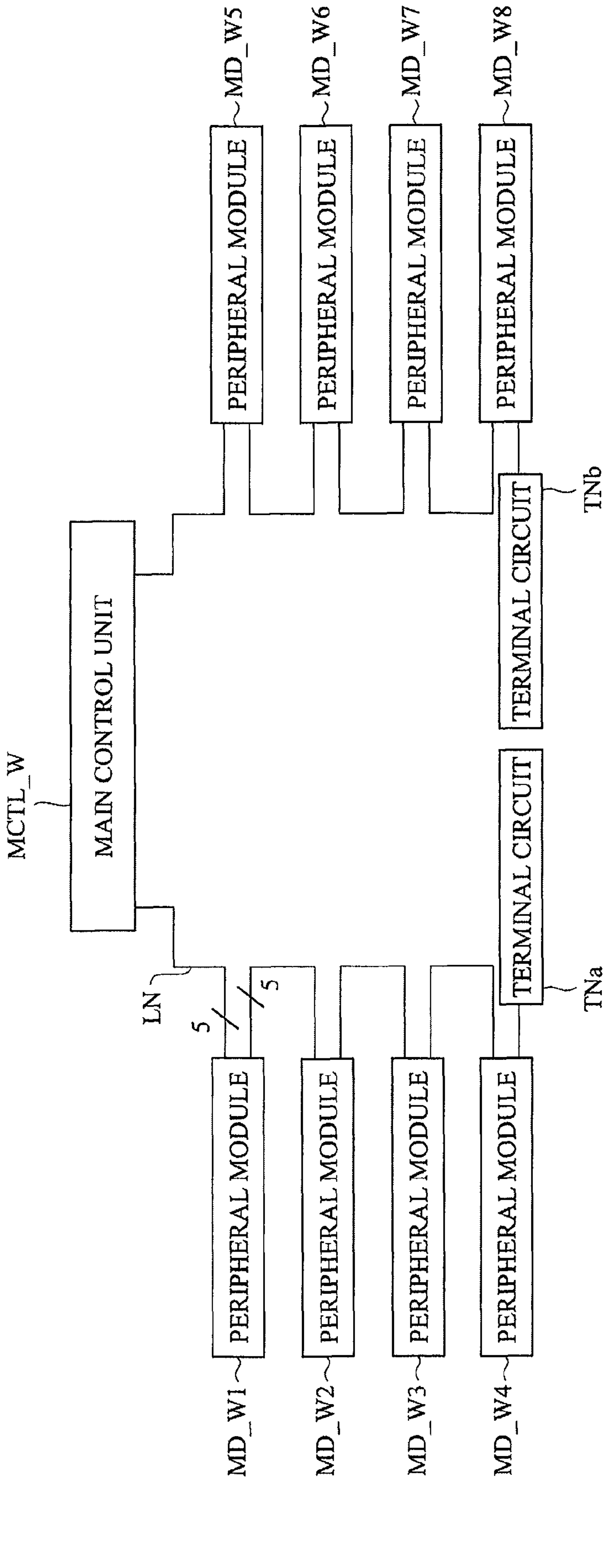
FIG. 11 is a block diagram showing an example of the configuration of a serial bus system according to a second embodiment of the present invention.

FIG. 11 is a block diagram showing an example of a configuration of a serial bus system according to the second embodiment of the present invention. As with FIG. 2, the serial bus system shown in FIG. 11 has a configuration in which a main control unit MCTL_W and a plurality of peripheral modules MD_WL to MD_W8 are electrically connected on the communication line LN, and both ends of the communication line LN are provided with the terminal circuits TNa and TNb.

The difference from FIG. 2 is the wiring topology in which the communication line LN is once extended into the interior of each of the peripheral modules MD_W, and the part extended from there to the outside is further extended into the interior of another peripheral module MD_W or the like. Therefore, to be precise, a plurality of physical communication lines LN are electrically connected via the main control unit MCTL_W and the plurality of peripheral modules MD_W so as to practically form one communication line LN. In other words, the configuration example of FIG. 11 can be described as a configuration in which the main control unit and the plurality of peripheral modules are at least electrically connected on the communication line LN.

Figure 12A:
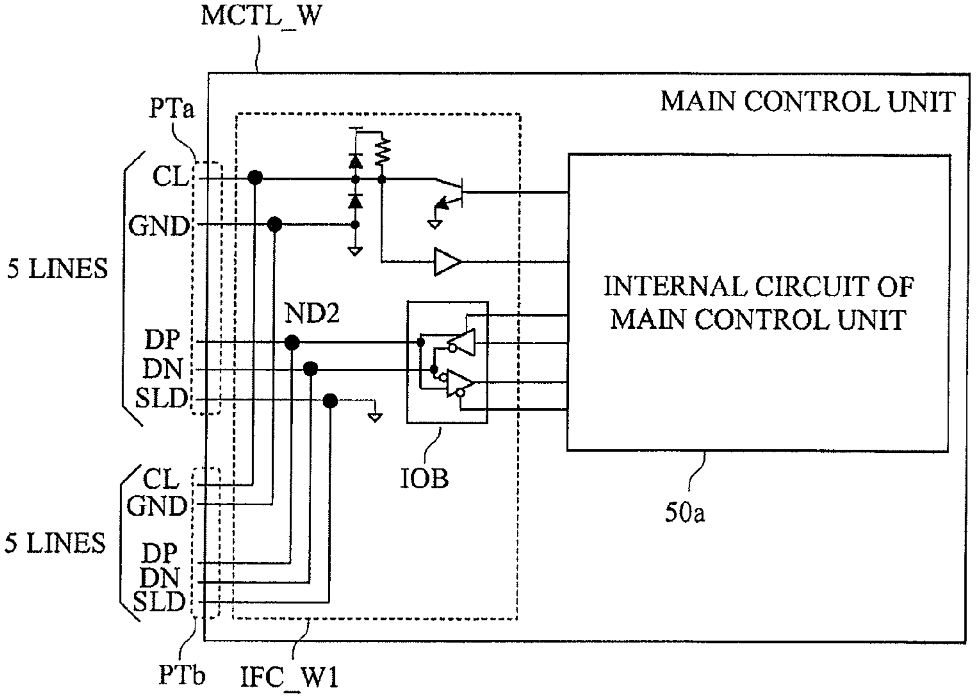
FIG. 12A is a circuit diagram showing a configuration example of a main control unit of a configuration example of interface circuits of the serial bus system of FIG. 11.
Figure 12B:
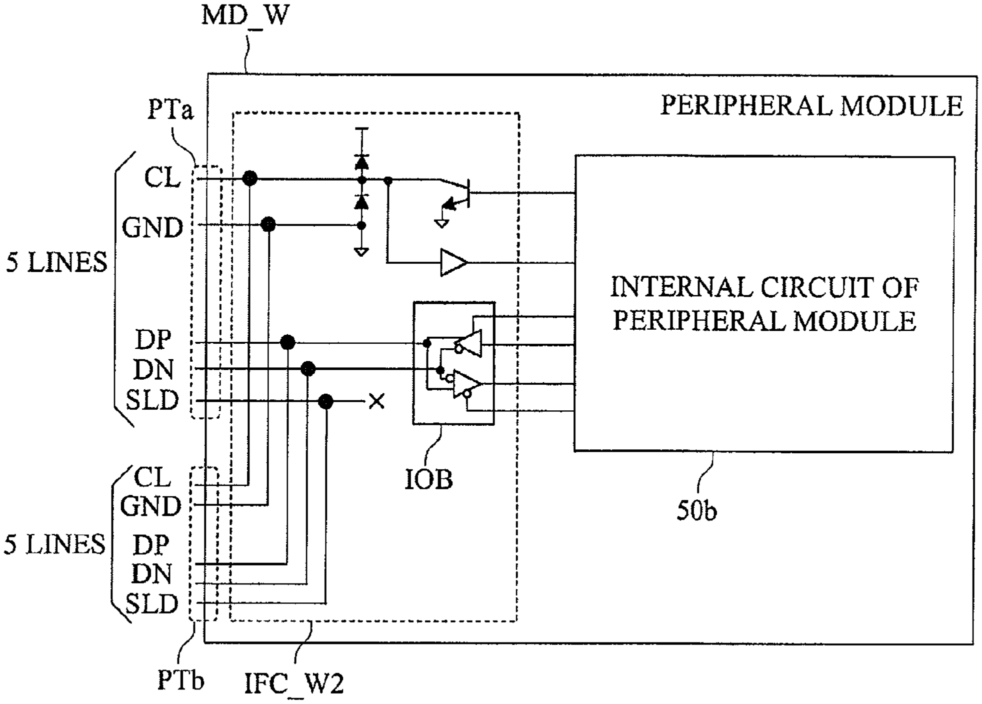
FIG. 12B is a circuit diagram showing a configuration example of a peripheral module of a configuration example of interface circuits of the serial bus system of FIG. 11.

FIGS. 12A and 12B show configuration examples of interface circuits of the serial bus system of FIG. 11. FIG. 12A is a circuit diagram showing a configuration example of the main control unit MCTL_W, and FIG. 12B is a circuit diagram showing a configuration example of the peripheral module MD_W. As with the main control unit MCTL of FIG. 5A, the main control unit MCTL_W shown in FIG. 12A has an interface circuit IFC_W1 and an internal circuit 50*a* which inputs/outputs data to or from IFC_W1 and realizes a predetermined function by using the input/output data.

However, different from the main control unit MCTL of FIG. 5A, the main control unit MCTL_W of FIG. 12A is characterized by having two systems of ports (ports PTa and PTb) each of which composed of a signal group (CL, GND, DP, DN, and SLD) of the communication line LN. The ports PTa and PTb of the two systems are respectively connected to the parts beyond branched wiring in IFC_W1, and they are mutually connected via the branch points. The configuration other than this is similar to that of the interface circuit IFC1 of FIG. 5A; therefore, detailed descriptions will be omitted.

Meanwhile, as with the peripheral module MD of FIG. 5B, the peripheral module MD_W shown in FIG. 12B also has an interface circuit IFC_W2 and the internal circuit 50*b* which inputs/outputs data to or from IFC_W2 and realizes a predetermined function by using the input/output data. As with the case of the main control unit MCTL_W of FIG. 12A, and different from the peripheral module MD of FIG. 5B, the peripheral module MD_W is also characterized by having two systems of ports (ports PTa and PTm) each of which composed of the signal group (CL, GND, DP, DN, and SLD) of the communication line LN. The configuration other than this is similar to that of the peripheral module MD of FIG. 5B; therefore, detailed descriptions will be omitted.

When the ports PTa and PTm of the two systems are provided and mutually connected at the branch points in the main control unit MCTL_W and the peripheral modules MD_W in this manner, the noise due to waveform reflection can be reduced; therefore, high-speed data transfer can be realized particularly in the signal lines DP and DN. In other words, in the wiring topology of FIG. 2, the influence of waveform refection cannot be ignored due to the wiring length from the branch point (for example, node ND1) on the communication line LN to the interface circuit IFC2 of the peripheral module (for example, MD1). On the other hand, in the wiring topology of FIG. 11, the branch point is, for example, a node ND2 shown in FIG. 12A, and the wiring length therefrom to the input/output buffer IOB, etc. in IFC_W1 is significantly short; therefore, a problem of waveform reflection is not particularly posed.

Figure 13:
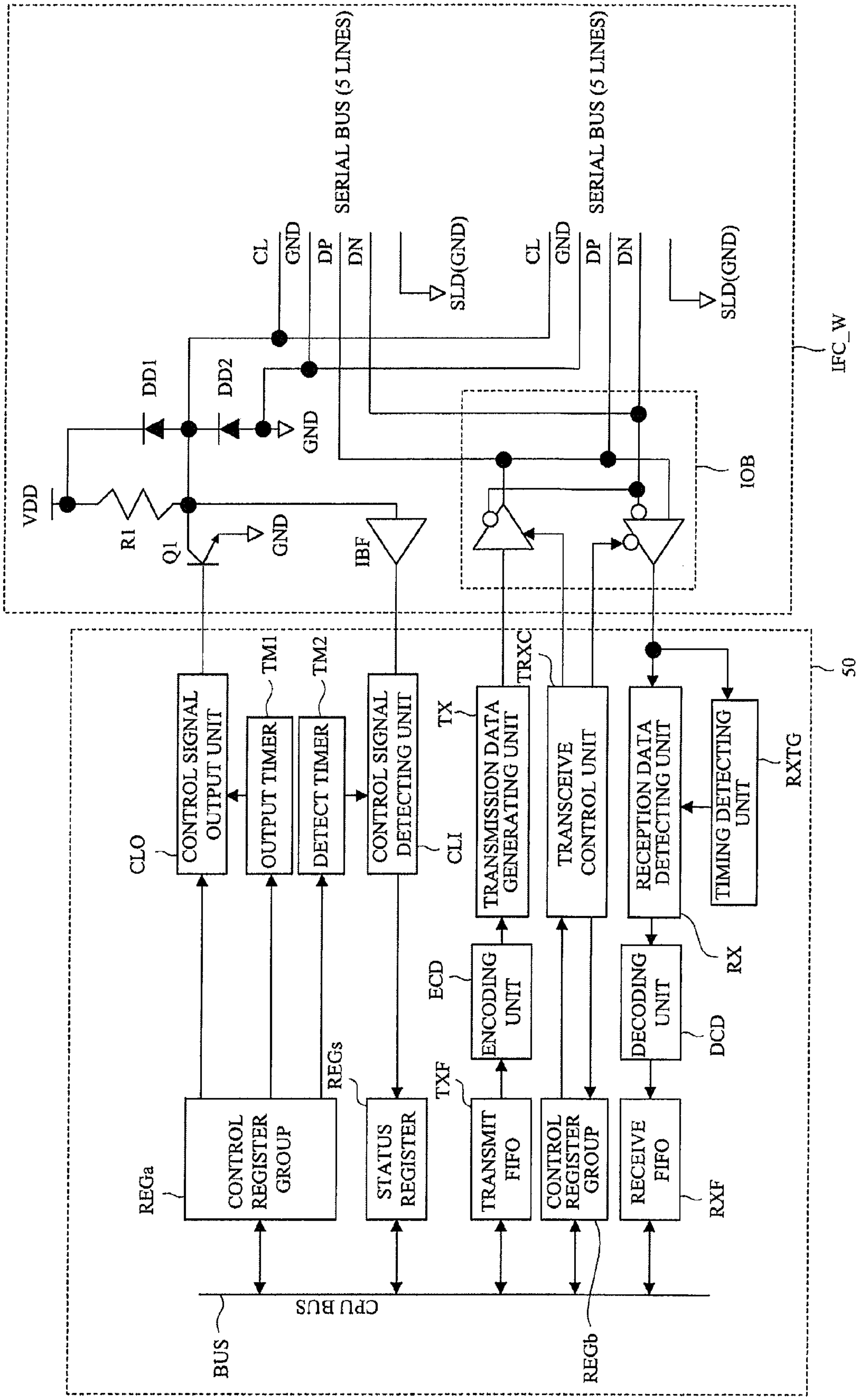
FIG. 13 is a block diagram showing a configuration example in more detail of the main control unit and the peripheral module of the serial bus system of FIG. 11.

FIG. 13 is a block diagram showing a configuration example in more detail than that of the main control unit MCTL_W and the peripheral module MD_W of the serial bus system of FIG. 11. FIG. 13 shows a configuration example of the circuit part that is shared by the main control unit MCTL_W and the peripheral modules MD_W. In other words, when, for example, an interface circuit IFC_W and an internal circuit 50 are provided in the main control unit MCTL_W and the peripheral module MD_W, the serial bus system of the present embodiment can be realized.

The interface circuit IFC_W corresponds to IFC_WL or IFC_W2 shown in FIGS. 12A and 12B. IFC_W includes, for example, a transistor Q1 which pulls down the control line CL to the ground voltage GND in response to control by the internal circuit 50, and an input buffer IBF which takes the signal of CL into the internal circuit 50, etc.; and, in the case of the main control unit MCTL_W, IFC_W further includes a resistor R1 which pulls up CL to the power supply voltage VDD. The ground voltage GND for CL is connected to the ground line GND included in the communication line LN. Moreover, IFC_W includes an input/output buffer IOB which transmits data from the internal circuit 50 to the signal lines DP and DN and receives data from the signal lines DP and DN and forwards the same to the internal circuit 50, and the ground voltage GND of IOB is connected to the shield line SLD included in the communication line LN. Furthermore, between CL-VDD and between CL-GND in IFC_W, diodes DD1 and DD2 for clamping are provided, respectively.

The internal circuit 50 corresponds to part of the internal circuit 50*a* or part of the internal circuit 50*b* shown in FIGS. 12A and 12B. First, a circuit block relating to the control line CL in the internal circuit 50 will be described. A control signal output unit CLO receives control by a control register group REGa and controls on/off of the transistor Q1. Herein, the on time of Q1 is regulated by an output timer TM1. The output timer TM1 is controlled by the control register group REGa and determines, for example, a 'L'-level period in the case of hard reset command issued in the main control unit MCTL_W and an output response period of the case of automatic address allocation in the peripheral modules MD_W.

A control signal detection unit CLI carries out write to a status register REGs in response to a signal from the input buffer IBF. In this process, CLI monitors the signal from IBF (in other words, the state of the control line CL) by using a detection timer TM2 which is controlled by the control register group REGa. Therefore, for example, in the peripheral module MD_W, when the period of the 'L' level in the hard reset is set in TM2, CLI can detect the fact that the hard reset command is issued. Note that, the control register group REGa and the status register REGs are controlled by a CPU, which is not shown, via a CPU bus BUS.

Next, a circuit block relating to the signal lines DP and DN in the internal circuit 50 will be explained. Upon data transmission, transmission data is written to a transmission FIFO (TXF) from the unshown CPU via the CPU bus BUS, and the transmission data is transmitted to the input/output buffer IOB via an encoding unit ECD and a transmission data generating unit TX. The encoding unit ECD and the transmission data generation unit TX performs, for example, addition of the transmission data to Manchester encoding or error code (CRC (Cyclic Redundancy Check) code, etc.) and transmit the data, which has undergone parallel-serial conversion, to IOB.

Meanwhile, upon data reception, received data from IOB is retrieved by using a received data detection unit RX and a timing detection unit RXTG, and the received data is written to a reception FIFO (RXF) via a decoding unit DCD. The timing detection unit RXTG is a so-called clock recovery circuit. The received data detection unit RX and the decoding unit DCD carry out, for example, serial-parallel conversion, error detection or error correction by checking error codes, and decoding of the Manchester code, etc. And, the received data written to RXF is transmitted to the unshown CPU via the CPU bus BUS. Note that, a control register group REGb controlled by the CPU is further connected to the CPU bus BUS, and a transmission/reception control unit TRXC is controlled by this REGb so as to perform switching of input/output with respect to IOB.

According to the serial bus system of the second embodiment as described above, the influence of waveform reflection can be reduced, and the reliability of data transfer can be improved in addition to the various effects described in the first embodiment.

(Third Embodiment)

Figure 14:
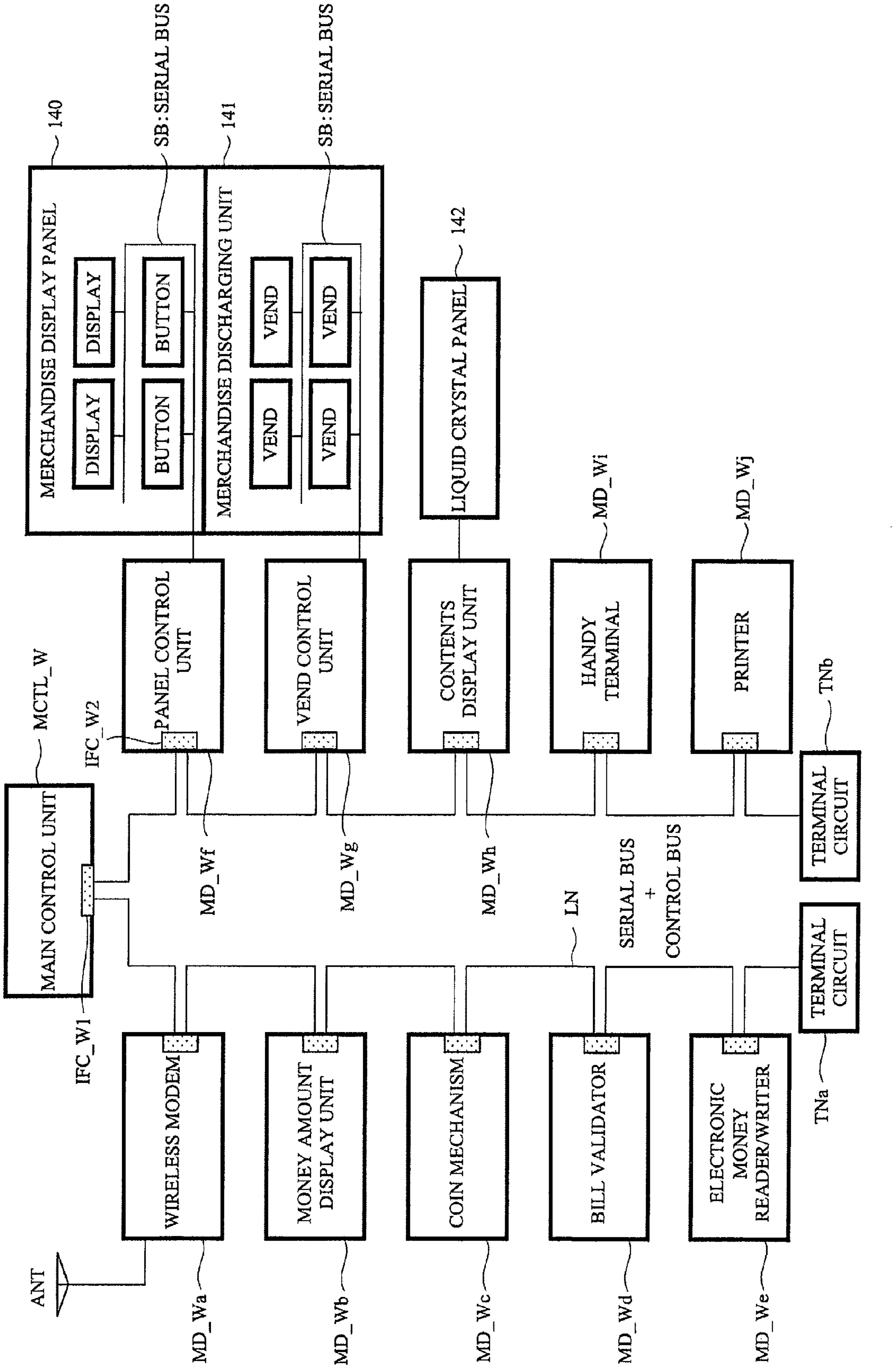
FIG. 14 is a block diagram showing an example of a configuration of an automatic vending machine according to a third embodiment of the present invention.

In a third embodiment, an example in which an automatic vending machine is composed by applying the wiring topology of FIG. 11 described in the second embodiment will be described. FIG. 14 is a block diagram showing an example of a configuration of the automatic vending machine according to the third embodiment of the present invention.

The automatic vending machine shown in FIG. 14 has the configuration in which, as with FIG. 11, a main control unit MCTL_W and a plurality of peripheral modules MD_Wa to MD_Wj are electrically connected on the communication line LN, and the terminal circuits TNa and TNb are connected at both ends of the communication line LN. MD_Wa is a wireless modem and has a function of carrying out wireless transmission/reception of data with outside via an antenna ANT. MD_Wb is a money amount display unit and has the function of displaying the money inserted by a user.

MD_Wc is a so-called coin mechanism and has the function of identifying the coins inserted by a user. MD_Wd is a so-called bill validator and has the function of identifying bills inserted by a user. MD_We is an electronic money reader/writer and has a function of processing payment of money using an IC card or the like. MD_Wf is a panel control unit and has a function of controlling a merchandise display panel 140. The merchandise display panel 140 has, for example, a configuration in which a plurality of buttons for selecting merchandise and display units of the merchandise are connected on a conventionally-used general serial bus SB which is controlled by MD_Wf. MD_Wf manages the purchase information of the merchandise from users via the merchandise display panel 140.

MD_Wg is a vending control unit and has the function of controlling a merchandise discharging unit 141. The merchandise discharging unit 141 has the configuration in which, for example, a plurality of vendors respectively storing different merchandise are connected on a conventionally-used general serial bus SB which is controlled by MD_Wg. The vending control unit MD_Wg acquires the merchandise purchase information of users at the panel control unit MD_Wf so as to control the merchandise discharging unit 141, thereby discharging the corresponding merchandise.

MD_Wh is a contents display unit which controls a liquid crystal panel 142. MD_Wh displays, for example, the contents data (advertisement, news, or the like), which is acquired via the wireless modem MD_Wa, on the liquid crystal panel 142. MD_W1 and MD_Wj are handy terminal and a printer, respectively, and these are used in, for example, maintenance/check of the automatic vending machine.

Figure 16:
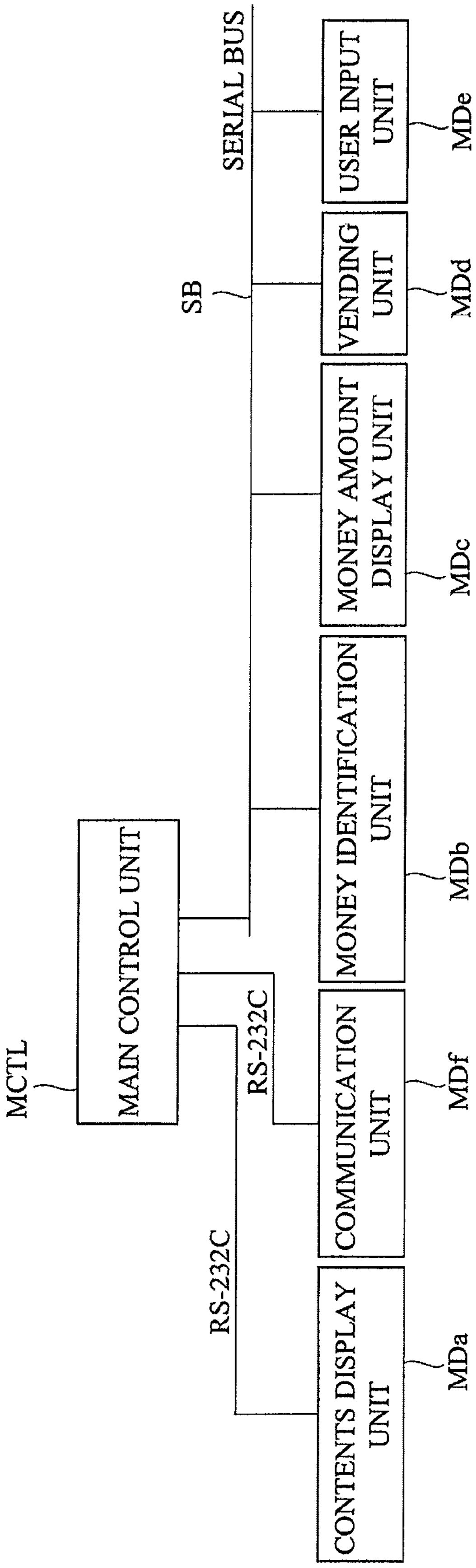
FIG. 16 is a block diagram showing a configuration example of an automatic vending machine which has been studied as a premise of the present invention.

In this manner, when the configuration in which the main control unit MCTL_W and all the peripheral modules MD_Wa to MD_Wj are connected in the serial bus form on the communication line LN including the signal lines DP and DN and the control line CL is used, the simple automatic vending machine excellent in maintenance performance and reliability as described above can be realized. Particularly, the wireless modem MD_Wa and the contents display unit MD_Wh require high/speed data transfer; therefore, when a conventional serial bus is used, for example, the configuration as shown in FIG. 16 has been had to be employed. However, in the present embodiment, by increasing the speed of the signal lines DP and DN, all of them can be connected by the serial bus. However, since the influence of noise may become obvious along with the increase of speed, maintenance performance is enhanced by providing the control line CL capable of carrying out hard reset as a fail-safe means and, furthermore, carrying out the automatic address allocation by using the control line CL.

(Fourth Embodiment)

Figure 15:
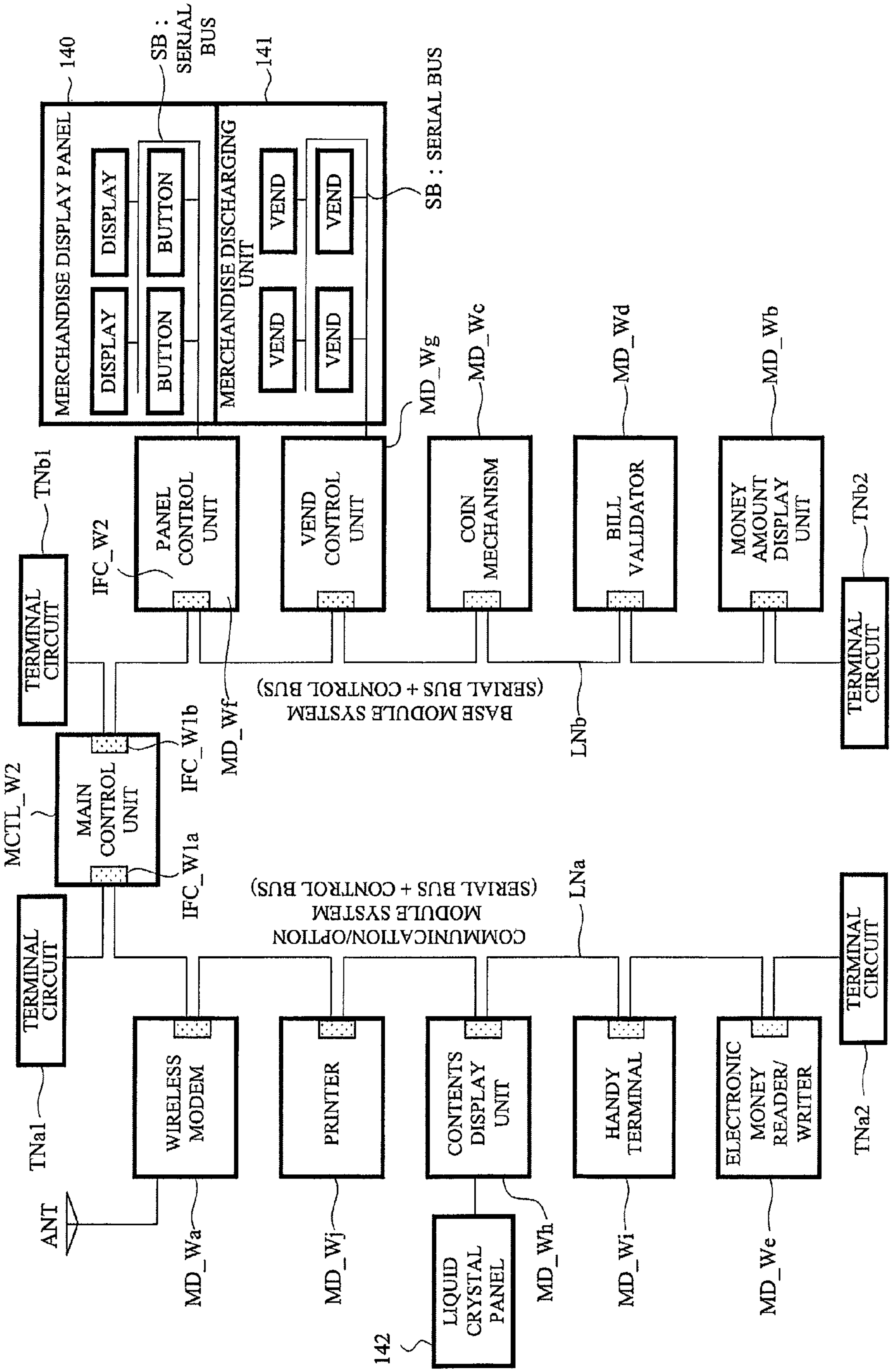
FIG. 15 is a block diagram showing an example of a configuration of an automatic vending machine according to a fourth embodiment of the present invention.

In a fourth embodiment, a configuration example which is a modification of the automatic vending machine of FIG. 14 described in the third embodiment will be described. FIG. 15 is a block diagram showing an example of the configuration of the automatic vending machine according to the fourth embodiment of the present invention.

As with FIG. 14, the automatic vending machine shown in FIG. 15 includes a main control unit MCTL_W2 and the plurality of peripheral modules MD_Wa to MD_Wj. However, different from FIG. 14, it is characterized in that two systems of communication lines LNa and LNb are provided, and the plurality of peripheral modules MD_Wa to MD_Wj are distributed to LNa and LNb.

The main control unit MCTL_W2 has two interface circuits IFC_W1 shown in FIG. 12A (IFC_W1a, IFC_W1b), the communication line LNa is connected to IFC_W1a, and the communication line LNb is connected to IFC_W1b. Terminal circuits TNa1 and TNa2 are connected to both ends of the communication line LNa, and terminal circuits TNb1 and TNb2 are connected to the both ends of the communication line LNb.

The communication line LNa is connected to the above-described wireless modem MD_Wa, the printer MD_Wj, the contents display unit MD_Wh, the handy terminal MD_W1, and the electronic money reader/writer MD_We. On the other hand, the communication line LNb is connected to the above-described panel control unit MD_Wf, the vending control unit MD_Wg, the coin mechanism MD_Wc, the bill validator MD_Wd, and the money amount display unit MD_Wb. In other words, the communication line LNb is connected to the peripheral modules (functional modules) having the basic functions of the automatic vending machine, and the communication line LNa is connected to the other peripheral modules of a communication system and the optional peripheral modules.

When such a configuration is employed, the above-described fail-safe function can be further enhanced. Specifically, since hard reset can be carried out while individually separating the communication lines LNa and LNb from each other, for example, even when the communication line LNa has to be subjected to hard reset due to, for example, failure of the communication system, the communication line LNb can maintain a good communication state, and the basic functions of the automatic vending machines are not impaired. Moreover, since the data transfer speeds essentially required by the communication line LNa and the communication line LNb are different from each other, the communication line LNb-side which can allow a low data transfer speed can be maintained to have low noise as much as possible. For this purpose, specifications in which the data transfer speeds of the communication line LNa and the communication line LNb are different from each other can be also used. Moreover, as a result of separating the communication line into the two systems, the wiring length of each of the communication lines can be shortened, and the number of the peripheral modules connected to each of the communication lines is reduced; therefore, noise can be reduced or the speed can be increased.

In the foregoing, the invention made by the inventors of the present invention has been concretely described based on the embodiments. However, it is needless to say that the present invention is not limited to the foregoing embodiments and various modifications and alterations can be made within the scope of the present invention.

The serial bus system of the present invention is a technique particularly effective in application to automatic vending machines, and not limited to this, it can be widely applied generally to serial bus systems including network systems.

What is claimed is:

1. An automatic vending machine in which a main control module and a plurality of functional modules which carry out predetermined operations under control of the main control module are connected via a communication line, wherein the plurality of functional modules include:

a communication module which acquires contents data from outside of the automatic vending machine by using wired or wireless communication;

a contents processing module which carries out a predetermined processing by using the contents data acquired by the communication module; and a basic module which carries out a processing which accompanies money insertion and merchandise purchase by a user, wherein the communication line includes a serial bus signal line and a control line which transmit a command signal or a data signal between the main control module and each of the functional modules, and wherein each of the main control module and, in accordance with needs, the functional modules comprises:

an input/output buffer circuit which carries out transmission and reception of a command signal or a data signal by using the serial bus signal line;

a switch circuit which drives an electric potential of the control line to a logical level of ‘L’ or ‘H’; and an input buffer circuit which retrieves the logical level of the control line, and the automatic venting machine having a configuration to execute:

a function of resetting all of the functional modules connected to the communication line when the electric potential of the control line is maintained at the predetermined logical level of ‘L’ or ‘H’ by the main control module for a certain period of time or more; and upon initial setting, after the functional module is added or changed or after the reset, a function of automatically allocating an addresses sequentially to each of the functional modules by, based on the logical level which is outputted from each of the functional modules to the control line and obtained from the control line to which an operation result of an AND logic or an OR logic of logical levels in an identification number unique to each of the functional modules is reflected, sequentially carrying out specification of the unique identification number of the functional module and allocation of an address to the functional module of the specified unique identification number by the main control module.

2. The automatic vending machine according to claim 1, wherein the signal line comprises a first signal line and a second signal line serving as a differential pair and a shield line which electromagnetically shields the first and second signal lines and is connected to a ground voltage, and the signal line and the control line are electromagnetically arranged in mutually different environments.

3. The automatic vending machine according to claim 1, wherein each of the plurality of functional modules has a unique identification number of N bits, the main control module has a first function of issuing a first command, which causes the logical level of an M-th bit ($N \geqq M$) of the identification number to be outputted to the plurality of functional modules via the signal line, and wherein each of the plurality of functional modules has:

a second function of outputting the logical level of the M-th bit of the functional module’s own identification number to the control line in response to the first command; and a third function of comparing the logical level of the M-th bit of the identification number outputted by the functional module itself with the logical level of the control line driven by the plurality of functional modules and, if unmatched, carrying out control so as not to accept the first command issued thereafter.

4. The automatic vending machine according to claim 1, wherein each of the plurality of functional modules always monitors the electric potential level of the control line and, if the electric potential of the control line is at the predetermined logical level for a certain period of time or more, carries out a reset operation of the functional module itself.

5. The automatic vending machine according to claim 1, wherein each of the main control module and the plurality of functional modules has a first port and a second port connected to each other inside the module itself; and, if any three modules of the main control module and the plurality of functional modules are named a module A, a module B, and a module C, the communication line connects the second port of the module A to the first port of the module B and connects the second port of the module B to the first port of the module C.

6. The automatic vending machine according to claim 1, wherein a plurality of the communication lines not mutually electrically connected are provided;

the communication module, the contents processing module, and the main control module are electrically connected to any of the plurality of communication lines; and the basic module and the main control module are electrically connected to any of the other plurality of communication lines.

7. A serial bus system used when electrically connected to a communication line having a serial bus configuration installed in an electronic device such as an automatic vending machine and comprising a main control module and a plurality of functional modules which execute predetermined operations under control of the main control module, wherein the communication line includes a serial bus signal line and a control line which transmit a command signal or a data signal between the main control module and each of the functional modules, the main control module has:

a first port which is configured to be electrically connectable with the plurality of functional modules via the communication line;

an interface circuit which transmits/receives a signal to or from the plurality of functional modules connected to the communication line via the first ports; and a control circuit which carries out input/output of a signal with respect to the interface circuit, wherein the interface circuit comprises:

an input/output buffer circuit which transmits/receives a command signal or a data signal to or from the plurality of functional modules, which are connected to the communication line, via the serial bus signal line;

a switch circuit which drives the electric potential of the control line to a logical level of 'L' or 'H'; and an input buffer circuit which transmits the logical level of the control line to the control circuit, and the serial bus system having a configuration to execute:

a function of resetting all the functional modules which monitor the electric potential level of the control line and are connected to the communication line by driving the switch circuit so as to maintain the electric potential of the control line to the predetermined logical level of 'L' or 'H' for a certain period of time or more; and, upon initial setting of the electronic device, after the functional module is added or changed or after the reset, a function of automatically allocating a sequential address to each of the functional modules by, based on the logical level which is outputted from each of the functional modules to the control line and obtained from the control line to which an operation result of an AND logic or an OR logic of logical levels of an identification number unique to each of the functional modules is reflected, sequentially carrying out specification of the unique identification number of the functional module and allocation of an address to the functional module of the specified unique identification number by the main control module.

8. The serial bus system according to claim 7, wherein the signal line comprises a first signal line and a second signal line serving as a differential pair and a shield line which electromagnetically shields the first and second signal lines and is connected to a ground voltage; and the signal line and the control line are electromagnetically arranged in mutually different environments.

9. The serial bus system according to claim 7, wherein each of the plurality of functional modules has a unique identification number of N bits, and wherein, when allocating the sequential address automatically, the main control module executes:

a first processing of issuing a first command, which causes the logical level of an M-th bit ($N \geqq M$) of the identification number to be outputted, to the plurality of functional modules via the signal line; and a second processing of retrieving the logical level of the M-th bit of the identification number outputted via the control line from each of the plurality of functional modules which has received the first command via the input buffer circuit, and detecting an AND operation result or an OR operation result in the control circuit.

10. The serial bus system according to claim 7, wherein, when each of the plurality of functional modules detects the fact that the electric potential level of the control line is driven by the switch circuit to the predetermined logical level for a certain period of time or more, the functional module executes a reset operation.

11. The serial bus system according to claim 7, wherein the main control module further has a second port; and the first and second ports and the interface circuit are mutually connected by a branched wiring.

12. The serial bus system according to claim 7, wherein the electric potential level of the control line is controlled in accordance with the AND logic; and the predetermined logical level is the 'L' level.

13. A serial bus system comprising:

a communication line including a signal line and a control line;

a first module electrically connected to the communication line; and a plurality of second modules which are electrically connected to the communication line and carry out predetermined operations in response to a command signal from the first module via the signal line, wherein the control line has a bus structure of the AND logic or the OR logic, wherein each of the first module and the plurality of second modules has:

an input/output buffer circuit which carries out transmission/reception of a command signal or a data signal by using the signal line;

a switch circuit which drives the control line to a first logical level; and an input buffer circuit which retrieves the logical level of the control line, and wherein the signal line comprises a first signal line and a second signal line serving as a differential pair and a shield line serving as a ground voltage for the first and second signal lines; and the control line comprises one first control line and a ground line serving as the ground voltage for the first control line.

14. A serial bus system comprising:

a communication line including a signal line and a control line;

a first module electrically connected to the communication line; and a plurality of second modules which are electrically connected to the communication line and carry out predetermined operations in response to a command signal from the first module via the signal line, wherein the control line has a bus structure of the AND logic or the OR logic, wherein each of the first module and the plurality of second modules has:

an input/output buffer circuit which carries out transmission/reception of a command signal or a data signal by using the signal line;

a switch circuit which drives the control line to a first logical level; and an input buffer circuit which retrieves the logical level of the control line, and wherein each of the plurality of second modules has a unique identification number of N bits, the first module has a first function of issuing a first command, which causes the logical level of an M-th bit ($N \geqq M$) of the identification number to be outputted, to the plurality of second modules via the signal line, and the plurality of second modules have:

a second function of outputting a logical level of the M-th bit of the second module's own identification number to the control line in response to the first command; and a third function of comparing the result of an AND operation or an OR operation carried out on the control line along with the second function with the logical level of the M-th bit of the identification number outputted by the second module itself and, in accordance with the comparison result, carrying out control so as to accept or not to accept the first command issued thereafter.

15. A serial bus system comprising:

a communication line including a signal line and a control line;

a first module electrically connected to the communication line; and a plurality of second modules which are electrically connected to the communication line and carry out predetermined operations in response to a command signal from the first module via the signal line, wherein the control line has a bus structure of the AND logic or the OR logic, wherein each of the first module and the plurality of second modules has:

an input/output buffer circuit which carries out transmission/reception of a command signal or a data signal by using the signal line;

a switch circuit which drives the control line to a first logical level; and an input buffer circuit which retrieves the logical level of the control line, and wherein the first module has a fourth function of driving the control line to the first logical level for a certain period of time or more; and the plurality of second modules always monitor the control line and, if the control line is at the first logical level for the certain period of time or more, carry out a reset operation of the second module itself.

16. A serial bus system comprising:

a communication line including a signal line and a control line;

a first module electrically connected to the communication line; and a plurality of second modules which are electrically connected to the communication line and carry out predetermined operations in response to a command signal from the first module via the signal line, wherein the control line has a bus structure of the AND logic or the OR logic, wherein each of the first module and the plurality of second modules has:

an input/output buffer circuit which carries out transmission/reception of a command signal or a data signal by using the signal line;

a switch circuit which drives the control line to a first logical level; and an input buffer circuit which retrieves the logical level of the control line, and wherein each of the main control module and the plurality of functional modules has a first port and a second port which are mutually connected inside the module itself; and, when any three modules of the main control module and the plurality of functional modules are named a module A, a module B, and a module C, the communication line connects the second port of the module A to the first port of the module B and connects the second port of the module B to the first port of the module C.

* * * * *